(12) United States Patent
Wu et al.

(10) Patent No.: US 11,171,759 B2
(45) Date of Patent: Nov. 9, 2021

(54) METHODS AND APPARATUS RELATED TO INTERFERENCE DETECTION AND MANAGEMENT USING ACK/NACK SIGNALS

(71) Applicant: QUALCOMM Incorporated, San Diego, CA (US)

(72) Inventors: Zhibin Wu, Sunnyvale, CA (US); Navid Abedini, Somerset, NJ (US); Junyi Li, Chester, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/379,611

(22) Filed: Apr. 9, 2019

(65) Prior Publication Data

US 2019/0319768 A1      Oct. 17, 2019

Related U.S. Application Data

(60) Provisional application No. 62/657,586, filed on Apr. 13, 2018.

(51) Int. Cl.
*H04L 5/00* (2006.01)
*H04W 72/12* (2009.01)
(Continued)

(52) U.S. Cl.
CPC .......... *H04L 5/0055* (2013.01); *H04L 1/1607* (2013.01); *H04W 72/0446* (2013.01); *H04W 72/1247* (2013.01); *H04W 76/11* (2018.02)

(58) Field of Classification Search
CPC ... H04B 7/0695; H04L 1/1607; H04L 1/1671; H04L 1/1861; H04L 5/0055;
(Continued)

(56) References Cited

U.S. PATENT DOCUMENTS 9,900,172 B2    2/2018  Goel et al.
2009/0019150 A1*  1/2009  Li ........................ H04B 7/086
                                                                    709/224
(Continued)

FOREIGN PATENT DOCUMENTS

CN      106162930 A     11/2016
CN      106470387 A      3/2017
(Continued)

OTHER PUBLICATIONS

International Search Report and Written Opinion—PCT/US2019/027051—ISA/EPO—dated Jul. 1, 2019.

*Primary Examiner* — Awet Haile
(74) *Attorney, Agent, or Firm* — Procopio, Cory, Hargreaves & Savitch LLP

(57) ABSTRACT

Various features and aspects related to methods and apparatus for interference detection, mitigation and/or avoidance using feedback signaling are described. In accordance with one aspect, a first device may transmit data to a second device in a first transmission slot. The first device may receive feedback from a third device including priority information corresponding to a link between the third device and a fourth device. The first device may determine whether to yield transmission of additional data to the second device during at least a second transmission slot based on the priority information.

30 Claims, 12 Drawing Sheets

(51) Int. Cl.
*H04W 72/04* (2009.01)
*H04W 76/11* (2018.01)
*H04L 1/16* (2006.01)

(58) Field of Classification Search
CPC ......... H04W 72/0446; H04W 72/1226; H04W 72/1247; H04W 74/0816; H04W 76/11; H04W 76/14
See application file for complete search history.

(56) References Cited

U.S. PATENT DOCUMENTS

| | | | |
|---|---|---|---|
| 2014/0140296 A1* | 5/2014 | Choi | H04L 5/0055 370/329 |
| 2016/0157260 A1 | 6/2016 | Laroia et al. | |
| 2017/0353398 A1 | 12/2017 | Hyun et al. | |
| 2018/0199351 A1* | 7/2018 | Ro | H04W 74/0833 |

FOREIGN PATENT DOCUMENTS

| CN | 106797644 A | 5/2017 |
|---|---|---|
| WO | 2014176426 A1 | 10/2014 |
| WO | 2015080486 A1 | 6/2015 |

* cited by examiner

METHODS AND APPARATUS RELATED TO INTERFERENCE DETECTION AND MANAGEMENT USING ACK/NACK SIGNALS

CROSS-REFERENCE TO RELATED APPLICATION(S)

This application claims the benefit of U.S. Provisional Application Ser. No. 62/657,586, entitled "Methods and Apparatus Related to Interference Detection and Management Using ACK/NACK Signals" and filed on Apr. 13, 2018, which is expressly incorporated by reference herein in its entirety.

TECHNICAL FIELD

The present disclosure relates generally to communication systems, and more particularly, to methods and apparatus related to design of acknowledgement (ACK)/negative acknowledgment (NACK) signals in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a first device. The apparatus may transmit data to a second device in a first transmission slot of a transmission opportunity. The apparatus may receive feedback from a third device, the feedback including priority information corresponding to a link between the third device and a fourth device. The apparatus may determine whether to yield transmission of additional data to the second device during at least a second transmission slot of the transmission opportunity based on the priority information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
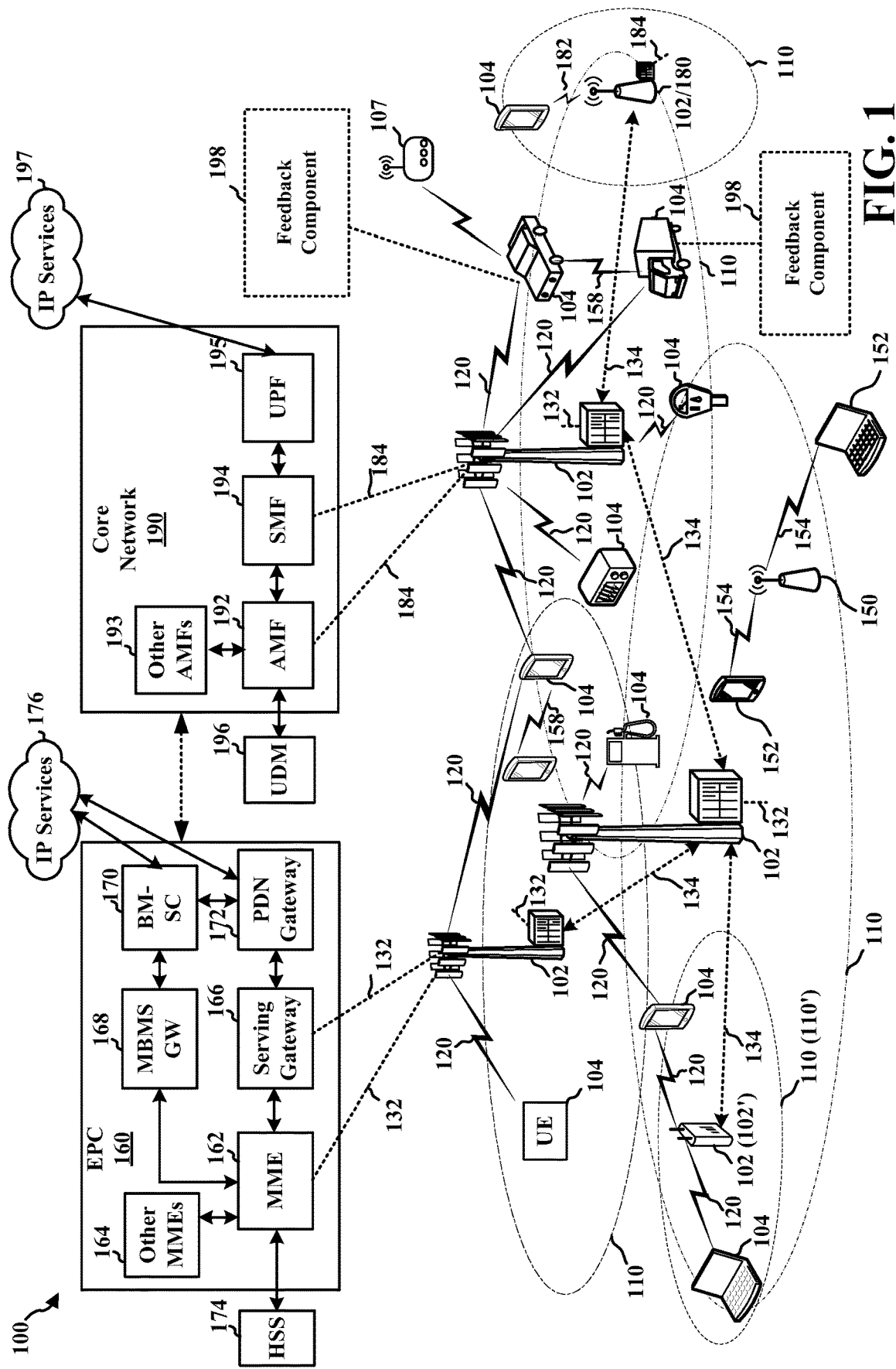
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming for a signal 182 with the UE 104 to compensate for the extremely high path loss and short range.

The base station 180 may transmit a beamformed signal to the UE 104 in one or more transmit directions, e.g., as described in connection with the example in FIG. 4. The UE 104 may receive the beamformed signal from the base station 180 in one or more receive directions, as described in connection with FIG. 4. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104, e.g., a transmitting Vehicle User Equipment (VUE) or other UE, may be configured to transmit messages directly to another UE 104, e.g., UE. The communication may be based on V2V/V2X or other D2D communication, such as Proximity Services (ProSe). Communication based on V2V, V2X, and/or D2D may also be transmitted and received by other transmitting and receiving devices, such as Road Side Unit (RSU) 107, etc. Aspects of the communication may be based on PC5 or sidelink communication.

In a wireless communication system, a number of device pairs may simultaneously attempt to communicate during the same time. In some scenarios, a transmitter of a first device pair may cause interference to a receiver of a second device pair and the problem may be aggravated if the interference causing transmitter and the victim receiver are relatively close. Accordingly, it should be appreciated that methods and apparatus that facilitate interference detection and management in such scenarios are desired. Various features and aspects presented herein provide methods and apparatus for interference detection and management (e.g., interference mitigation and/or avoidance) in wireless communication networks using example ACK/NACK signaling.

Referring again to FIG. 1, in certain aspects, a first device such as UE 104 may transmit data to a second device in a first transmission slot of a transmission opportunity. The first device may include a feedback component 198 configured to receive an ACK/NACK from a third device including priority information corresponding to a link between the third device and a fourth device, and determine whether to yield transmission of additional data to the second device during at least a second transmission slot of the transmission opportunity based on the priority information. Similarly, the feedback component may be configured to provide such feedback to other devices. Although the example is described using a UE, other devices such as RSU 107, or a base station or other device communicating based on sidelink may apply aspects presented herein. As discussed in more detail infra, the determination to yield transmission may be further based on addition factors in some configurations. Various additional aspects and details of the disclosed methods and apparatus are discussed infra with respect to FIGS. 5-9. Various features of the methods described herein may facilitate interference detection and management (e.g., interference mitigation and/or avoidance) in wireless communication networks, e.g., using ACK/NACK signaling. Although certain aspects may be presented with examples focused on NR, the concepts described herein may be applicable to other similar areas, such as LTE, LTE-A, CDMA, GSM, and other wireless technologies.

Figure 2:
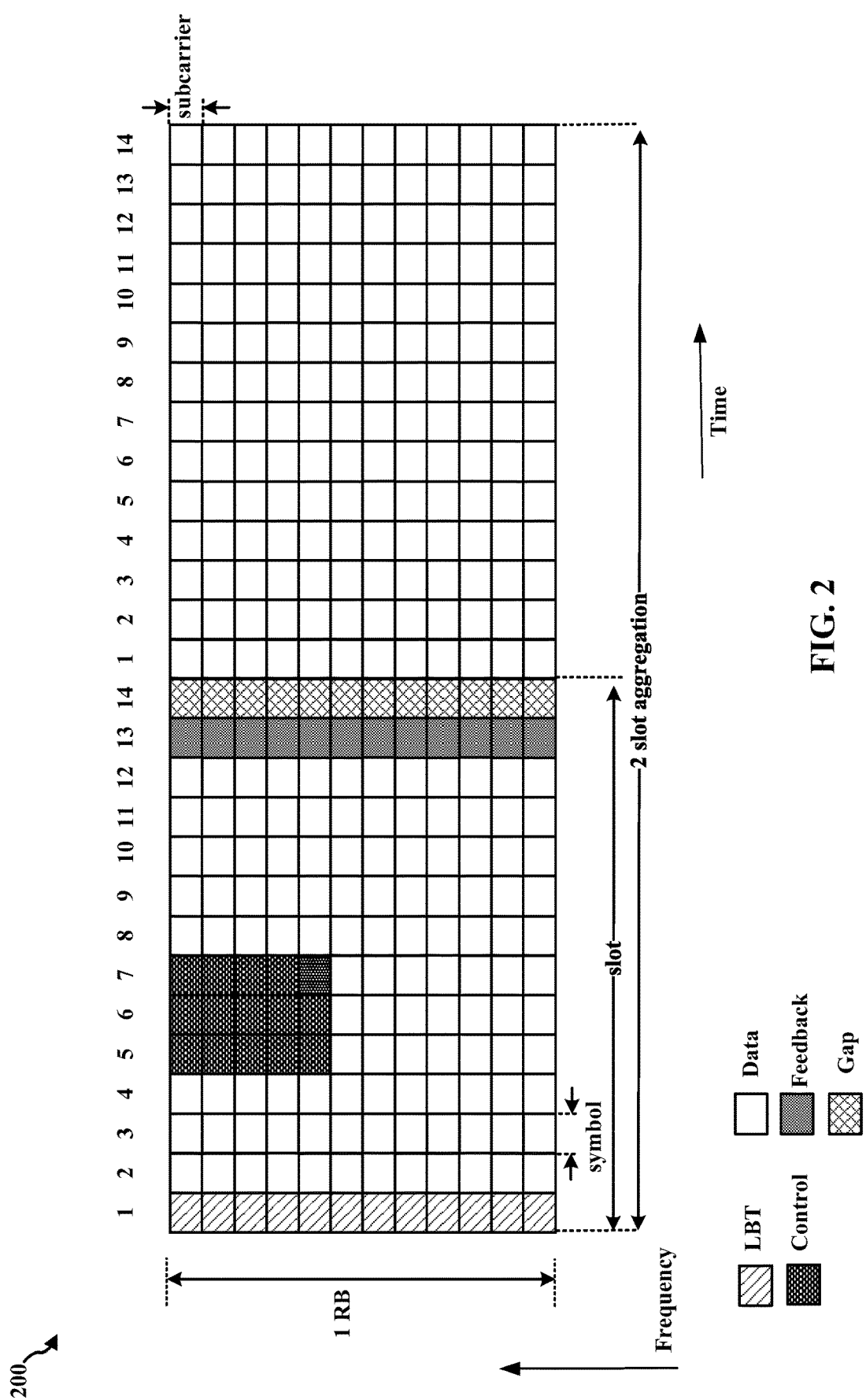
FIG. 2 illustrates an example of a sidelink slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. A slot may be referred to as or include one or more transmission time intervals (TTIs), and may vary in length based on sub carrier spacing (SCS) or other configuration. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation reference signal (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slot. The aggregated number of slots may also be larger than two. When slots are aggregated, the symbols used for feedback and/or a gap symbol may be different that for a single slot.

Figure 3:
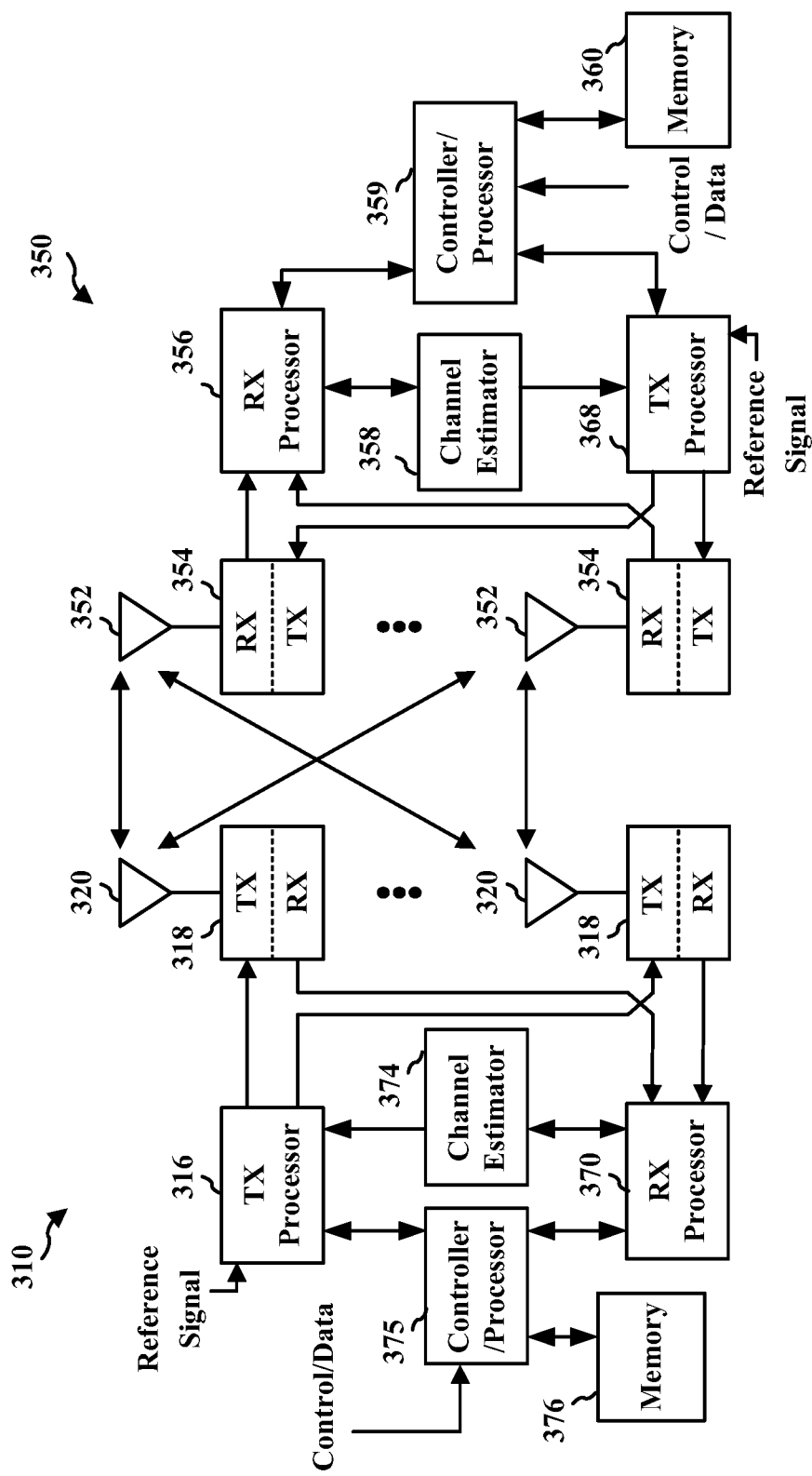
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device 350 may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the TX processor 316, the RX processor 356, the RX processor 370, the controller/processor 375, and the controller/processor 359 may be configured to perform aspects described in connection with 198 in FIG. 1.

Figure 4:
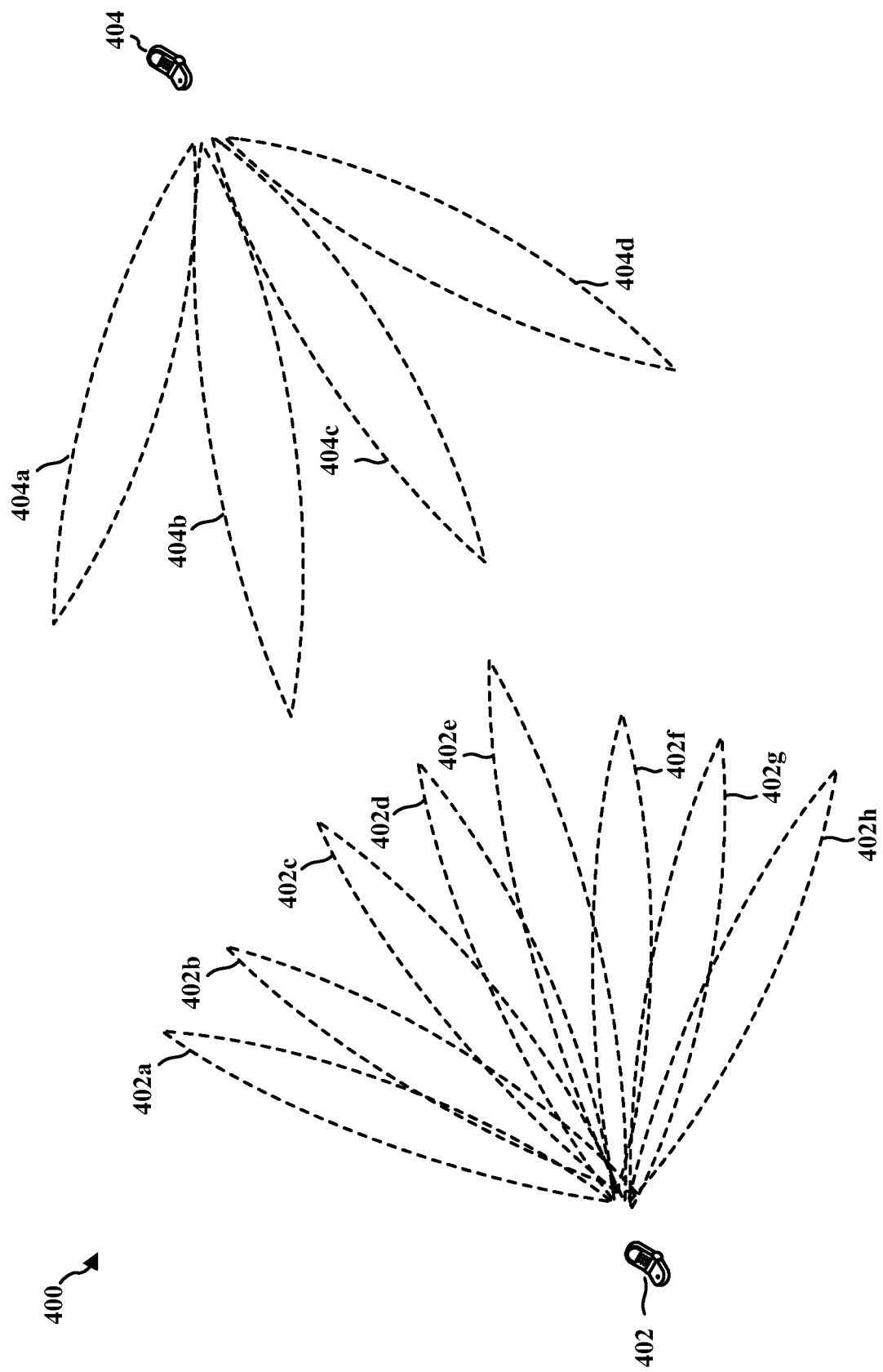
FIG. 4 is a diagram illustrating a first device in communication with a second device using directional beams.

FIG. 4 is a diagram 400 illustrating a first device 402 in communication with a second device 404. Referring to FIG. 4, the first device 402 may transmit a beamformed signal to the second device 404 in one or more of the directions 402a, 402b, 402c, 402d, 402e, 402f, 402g, 402h. The second device 404 may receive the beamformed signal from the first device 402 in one or more receive directions 404a, 404b, 404c, 404d. The second device 404 may also transmit a beamformed signal to the base station 402 in one or more of the directions 404a-404d. The first device 402 may receive the beamformed signal from the second device 404 in one or more of the receive directions 402a-402h. The first device 402/second device 404 may perform beam training to determine the best receive and transmit directions for each of the first device 402/second device 404. The transmit and receive directions for the first device 402 may or may not be the same. The transmit and receive directions for the second device 404 may or may not be the same.

While the above discussion with reference to FIG. 4 illustrates beamformed communication between a UE and a UE, it should be appreciated that the same concept of beamformed communication may be applicable to communication between any pair of devices, e.g., between a UE and UE, between UE and an RSU, between a UE and a base station, etc.

In a wireless communication system, a number of device pairs may independently and simultaneously attempt to communicate. If various devices are attempting to communicate using a common pool of resources without prior reservation and/or scheduling of transmission time slots by a controller, it may be possible that transmissions from a transmitter of one device pair may cause interference to other devices attempting to communicate during the same transmission time slot(s). In such a scenario, a transmitter of a first device pair may cause interference to a receiver of a second device pair and the problem may be aggravated if the interference causing transmitter and the victim receiver are relatively close. Furthermore, the different device pairs may be associated with different levels of link priorities. The present application provides aspects that enable an interference causing transmitter, in such situations, to detect that it is causing interference to a higher priority link, and to take action to mitigate the interference. Accordingly, that the present application provides methods and apparatus that facilitate interference detection and management.

Various features and aspects that support interference detection and/or mitigation using feedback (e.g., ACK/NACK signaling) are described herein. In accordance with one aspect, feedback (such as an ACK and/or NACK) from a device may be configured to include priority information, e.g., indicating priority of a communication link between a first device pair (which may be two vehicles or other UEs). In accordance with features described herein, a nearby transmitter, corresponding to another (e.g., second) communicating device pair, that overhears the feedback may determine whether to yield transmission of data to its corresponding receiver during one or more data transmission slots based on the received feedback, e.g., based on the priority information therein and/or other features of the Feedback. Various additional aspects and features are discussed infra in more detail.

Figure 5B:
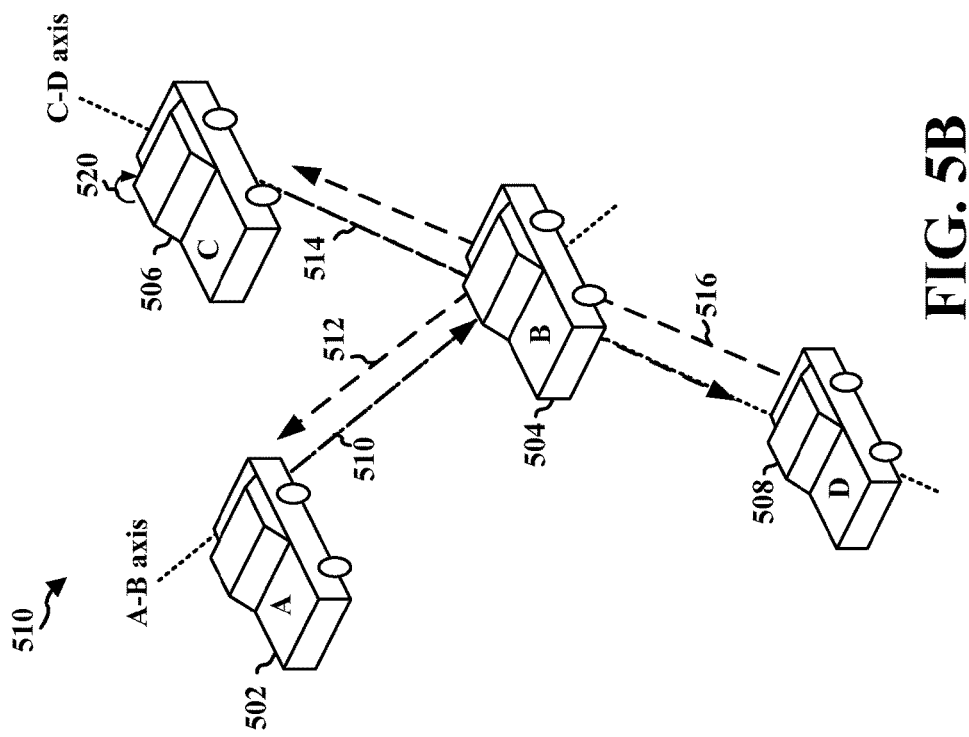
FIG. 5B illustrates an example where the devices of a first device pair associated with a high priority link may be attempting to communicate during the same transmission opportunity during which devices associated with a lower priority link are communicating.
Figure 5A:
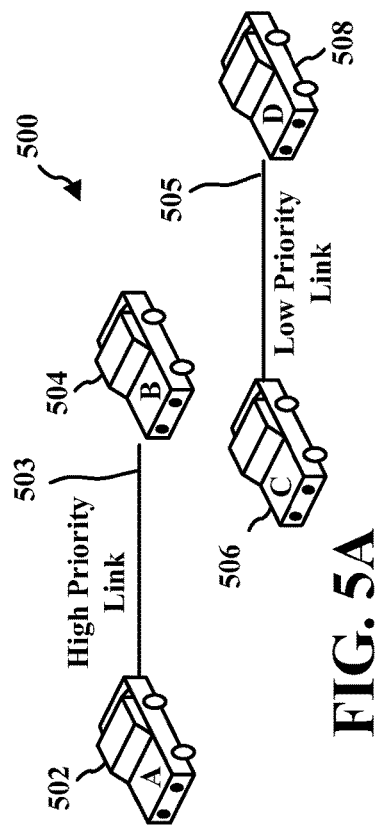
FIG. 5A illustrates an example of two device pairs in communication over separate links where one device pair may have a link priority higher than a link priority of another device pair.

FIG. 5A illustrates a diagram 500 depicting an example of two device pairs in communication over separate links where a device pair (e.g., device pair A-B) may have a link priority higher than a link priority of the other device pair (e.g., device pair C-D). The first device pair in the illustrated example comprises device A 502 (e.g., data transmitter) and device B 504 (e.g., receiver), and the second device pair comprises device C 506 (e.g., data transmitter) and device D 508 (e.g., receiver). Device A 502 may be communicating with (e.g., transmitting data to) device B 504 over a first communication link 503 (e.g., link A-B) and device C 506 may be simultaneously communicating with device D 508 over a second communication link 505 (e.g., link C-D). In the example, the first communication link 503 (link A-B) has a higher priority than the second communication link 505 (link C-D). The higher link priority for link A-B 503 may be due to, for example, the type of communication, e.g., safety/emergency message, and/or other time sensitive signaling, between the device A 502 and device B 504. The higher priority may also be due to, for example, a higher level of service subscription, quality of service, or device priority associated with device A 502 and/or device B 504. For the example being discussed, it may be assumed that the two device pairs may be communicating simultaneously during a same transmission opportunity. For example, given that there may be no central controller or scheduling entity, device pair A-B and device pair C-D may have selected the same transmission opportunity (e.g., a set of time-frequency communication resources) for communicating, and thus device pair A-B and device pair C-D may be communicating in the same transmission slot as discussed in more detail infra.

FIG. 5B illustrates a diagram 525 showing an example scenario where device A 502 and device B 504 associated with a high priority link may be communicating during the same transmission opportunity (or at least during one same transmission time slot of the transmission opportunity) as device C 506 and device D 508 associated with a lower priority link. Continuing with the example discussed above with respect to FIG. 5A, the communication link 503 between device A 502 and device B 504 may have a higher priority than the communication link 505 between device C 506 and device D 508. Among the device pair A-B, device A 502 may be the transmitter (of data) while device B 504 may be the receiver. Among the device pair C-D, device C 506 may be the transmitter (of data) while device D 508 may be the receiver. Diagram 525 also shows how the devices may be located relative to each other in the example scenario being described. As the devices may comprise mobile devices, the location relative to each other may change over time.

In the illustrated example, consider that the device A 502 and device B 504 may have selected the same transmission opportunity (TxOP) for communication as device C 506 and device D 508. In the example, device A 502 may transmit data signal 510 to device B 504 during a first data transmission portion of a transmission slot corresponding to a transmission opportunity. Because device C 506 in the other device pair chose the same transmission opportunity (unaware at the time that the device pair A-B associated with a high priority link may also communicate in the same TxOP), device C 506 may transmit a data signal 514 to device D 508 during the first data transmission portion of the same transmission slot corresponding to the transmission opportunity causing interference to device B 504 (the receiver in the device pair A-B). Due to the interference caused by the transmission from device C 506, device B 506 may not be able to properly receive and decode the data signal 510 from device A 510. Failing to properly decode the data transmission from device A 502, device B 504 may transmit a NACK 512 in a ACK/NACK portion of the transmission slot to notify device A 502 of the failure to receive/decode the data signal 510. Thus, in such a scenario, a high priority receiver (device B 504) may suffer due to the interference caused by a low priority transmitter (device C 506). On the other hand, assuming device D 508 successfully receives and decodes the data signal 514, device D 508 may transmit an ACK 516 to indicate that data signal 514 from device C 506 has been successfully received/decoded. Given the common timing of the transmission opportunity (and the corresponding transmission slots therein) being used by the devices 502, 504, 506, and 508, the transmission of the NACK 512 from device B 504 may overlap with the transmission of the ACK 516 from device D 508. Assuming that device B 504 and device D 506 use different preambles (e.g., different sequences) for their respective NACK 512 and ACK 516, device C 506 in the example may receive both the signals, e.g., the NACK 512 from device B 504 and the ACK 516 from device D 508.

It may be appreciated that without a proper notification mechanism to indicate device C 506 regarding the interference that Device C is causing to the high priority link (A-B) 503, device C 506 may continue to transmit additional data in subsequent transmission slots of a Transmission Opportunity (TxOP) thereby causing continued interference and loss to the high priority receiver (device B 504). In order to indicate to a transmitter, such as device C 506 in the example, that its transmissions are causing interference to a nearby high priority receiver (device B 504), in accordance with one aspect, ACK/NACK signals may be configured to carry priority information corresponding to a communication link associated with the device transmitting such ACK/NACK signaling. In accordance with the features of the methods described herein, if the transmitter (e.g., device C 506) causing interference hears such an ACK/NACK signal indicating a link priority higher than a link priority of the transmitter's own communication link (e.g., link 505), the transmitter may determine to yield transmission in the next one or more transmission slots of the transmission opportunity.

Thus, with reference to the example illustrated in FIG. 5B, in accordance with one aspect, the NACK 512 from device B 504 may be configured to include link priority information corresponding to the link A-B 503. Similarly, in some configurations, the ACK 516 from device D 508 may carry link priority information corresponding to the link C-D 505. Upon receiving the NACK 512, device C 506 may determine (520) that the link priority of the link A-B 503 is higher than the link priority of its own link (C-D 505) with device D 508. In some configurations, the determination may be simply based on a comparison of the link priorities. Realizing that the link priority indicated in the NACK 512 is higher than the link priority of its own link and the fact that the received signal is a NACK (indicating that device B 504 failed to receive and/or decode the data intended for device B 504), device C 506 may determine (520) to yield (e.g., give up) transmission of additional data in its own link (C-D 505) to avoid causing interference to the higher priority link (A-B 503) indicated by this NACK signal. In some configurations, the decision to yield transmission may be for at least the next transmission slot of the transmission opportunity. In some other configurations, the decision to yield transmission may be for the entire transmission opportunity which may include multiple transmission slots.

While in some configurations, the determination/decision by an interfering transmitter (such as device C 506) whether to yield transmission of additional data may be based on the priority information indicated in a received ACK/NACK signal, in some other configurations, the determination/decision may be further based on additional factors such as, for example, received power level of the ACK/NACK signal, and/or whether the received ACK/NACK signal is an ACK or a NACK. Various related aspects are discussed in more detail infra in connection with the flowchart 700.

In various configurations, based on the determination to yield transmission, device C 506 may refrain from transmitting the additional data to the second device, e.g., during at least a second transmission slot of the transmission opportunity. Thus, as should be appreciated, the techniques described herein may allow a transmitter (e.g., a low priority interfering transmitter such as device C 506 in the example) to determine that it is causing interference to a high priority receiver and may force the transmitter to yield. On the other hand, if determination is made to not yield based on the priority information and/or other factors, e.g., to continue transmission, then device C 506 may transmit the additional data to the second device during the next transmission slot of the transmission opportunity.

Figure 5C:
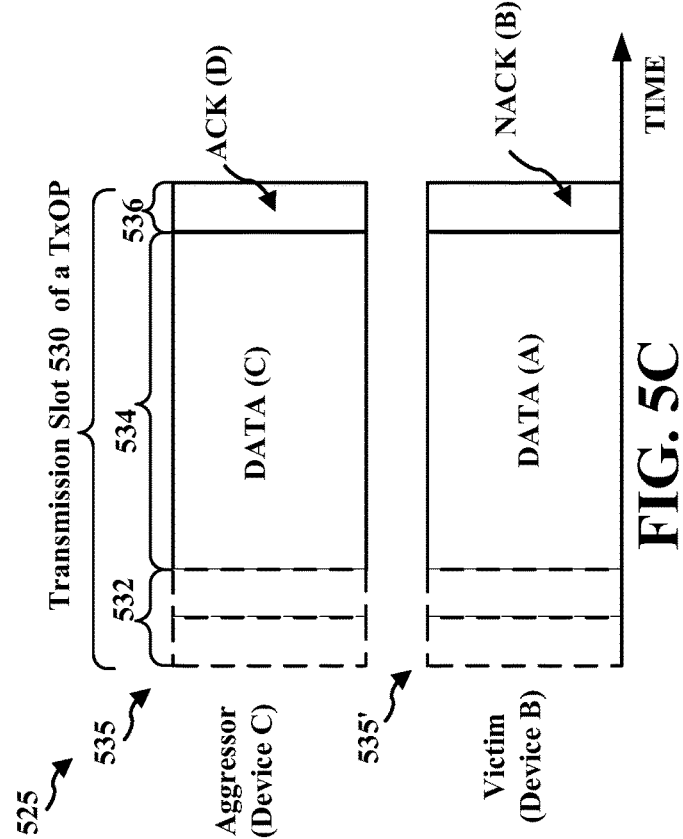
FIG. 5C illustrates an example structure of a transmission slot corresponding to a transmission opportunity (TxOP) which may be utilized for communication by the two different device pairs shown in FIGS. 5A-5B.

FIG. 5C illustrates a diagram 525 showing an example structure of a transmission slot 530 corresponding to a transmission opportunity (TxOP) which may be utilized by the two different device pairs (device pair A-B and device pair C-D) shown in FIGS. 5A-5B for communication. In the example illustrated in FIG. 5C, the first diagram 535 shows the use of the transmission slot 530 from the perspective of device pair C-D (associated with low priority link) while the second diagram 535' shows the use of the same transmission slot 530 from the perspective of device pair A-B (associated with high priority link). As can be appreciated from the illustration, in the example the same transmission slot 530 may be used for communication by both device pairs. With reference to FIG. 5B, device C 506 (data transmitter in the device pair C-D) may be considered as an aggressor node causing the high priority receiver device B 504 which may be considered as the victim node. In other words, the data transmission from device C 506 (aggressor node) in the same transmission slot 530 causes interference to device B (victim node).

The transmission slot 530 may comprise a plurality of portions (e.g., subslots) including one or more reservation subslots 532, a set of data transmission subslots 534, and at least one ACK/NACK subslot 536. In some configurations, the transmission slot 530 may correspond to a subframe and each portion/subslot of the transmission slot 530 may comprise one or more symbols (e.g., OFDM/SC-FDMA symbols).

Referring to diagram 535 device C 506 may use the set of subslots 534 to transmit data (e.g., data signal 514) to device D 508. Upon reception and successful decoding of the received data, device D 508 (which is the receiver of the data from device C 506) may transmit an ACK (e.g., ACK 516) in the subslot 536 as shown in the figure. On the other hand, the other device pair A-B may be attempting to communicate at the same time. For example, referring to diagram 535', device A 502 may use the set of subslots 534 to transmit data (e.g., data signal 510) to device B 504. As discussed above in connection with FIG. 5B, because of interference caused by the aggressor node (device C 506), device B 504 may not be able to receive/decode the data signal 510 from device A 502. Accordingly, device B 502 may transmit a NACK (e.g., NACK 512) in the ACK/NACK transmission portion 536 of the time slot 530. However, rather than simply communicating an indication of failure to receive/decode the data, the NACK 512 from device B 504 may be configured to carry priority information corresponding to the communication link 503 between device A 502 and device B 504. As discussed supra, use of such ACK/NACK signaling allows the victim node (device B 504) to indicate to the aggressor node (device C 506) that its transmissions are causing interference to the high priority receiver (device B 504).

Figure 6:
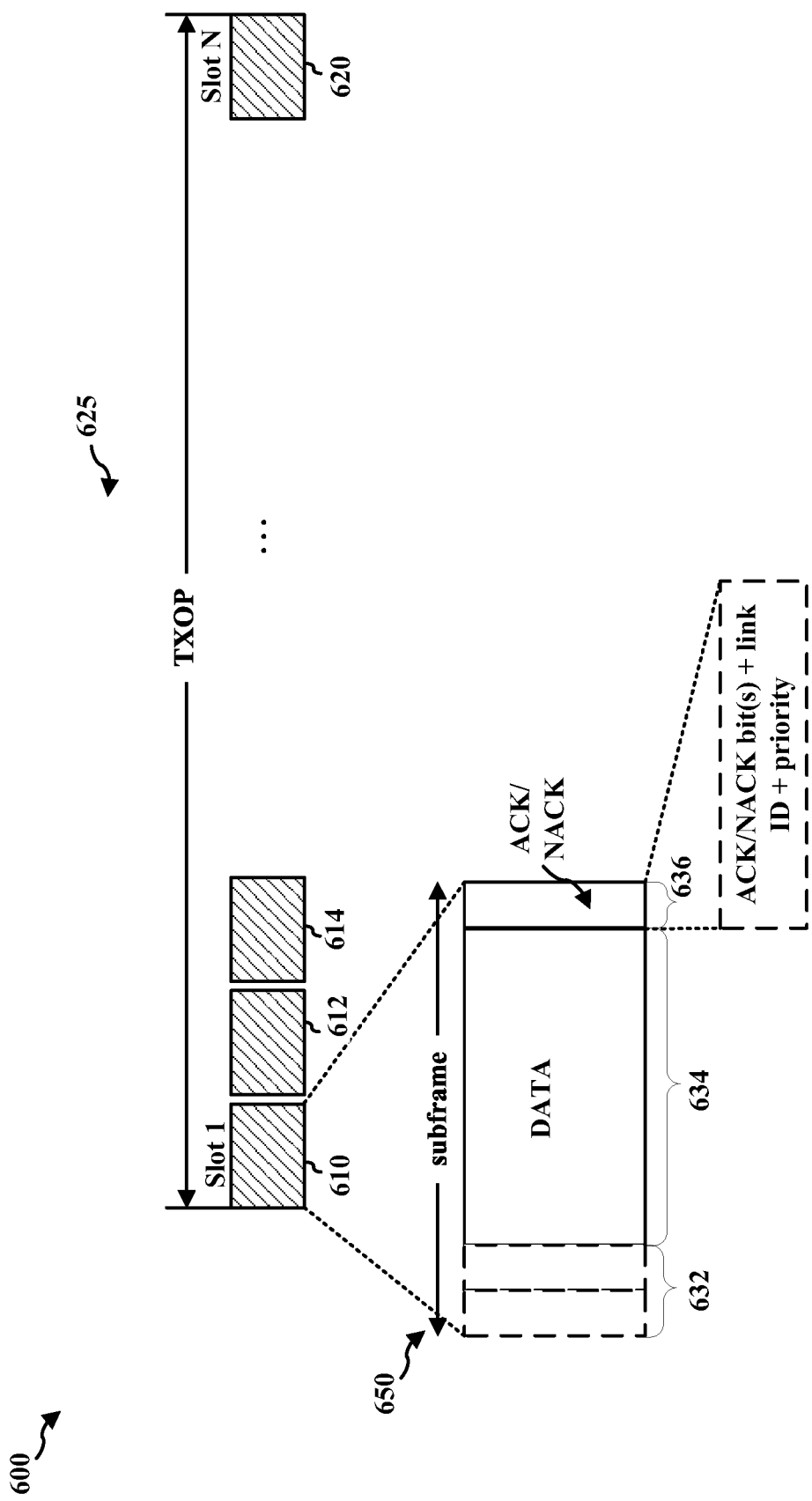
FIG. 6 illustrates a diagram showing an example timing structure of a transmission opportunity comprising a plurality of transmission time slots.

FIG. 6 illustrates a diagram 600 showing an example timing structure of a transmission opportunity 625 comprising a plurality of transmission time slots which may be used by devices for transmitting data and ACK/NACK signals, and further showing the structure of a transmission time slot 610. The transmission opportunity 625 may correspond to, for example, a portion of a sidelink channel that may be used for D2D type communications (e.g., including peer-to-peer (P2P), vehicle-to-vehicle (V2V), and vehicle-to-everything (V2X) communications.

In the illustrated example, the transmission opportunity 625 may include transmission slot 1 610, transmission slot 2 612, transmission slot 3 614, . . . , transmission slot N 620. Each transmission slot may have a similar structure as illustrated with respect transmission slot 530 of FIG. 5C and as illustrated for transmission slot 1 610 in diagram 650. In one configuration, the transmission slot 610 (and each of the other slots of the TxOP 625) may correspond to one subframe and each portion/subslot of the transmission slot 610 may comprise one or more symbols (e.g., OFDM/SC-FDMA symbols). As discussed above with respect to transmission slot 530 of FIG. 5C, the transmission slot 610 may comprise various portions including a reservation portion 632, a data transmission portion 634, and an ACK/NACK transmission portion 636. The reservation portion 632 may be used for slot reservation requests and responses which may be transmitted by a pair of devices intending to communicate. The data transmission portion 634 may be used for data transmission, and the ACK/NACK portion 636 may be used for transmission of example ACK/NACK signals (e.g., NACK 512 and ACK 516) of the type discussed herein, e.g., which may include and/or otherwise indicate priority information corresponding to a communication link.

As illustrated, in accordance with one aspect, the ACK/NACK portion 636 may be used to carry one or more bits indicating whether a transmitted ACK/NACK signal is an ACK or a NACK. For example, in one configuration a single bit (0 or 1) may be used to indicate whether the transmitted signal in the ACK/NACK portion 636 is an ACK or a NACK. In addition to the ACK/NACK bit(s), an ACK/NACK signal configured in accordance with the methods described herein may further carry a link ID identifying a communication link (e.g., such as an identifier of link 503/505), and priority information indicating a priority of the link identified by the link ID. While the priority information may be included in the ACK/NACK signal (e.g., explicitly indicated in the ACK/NACK) in some configurations, in other configurations the priority information may be implicitly indicated by the link ID as discussed further below in more detail.

Figure 10:
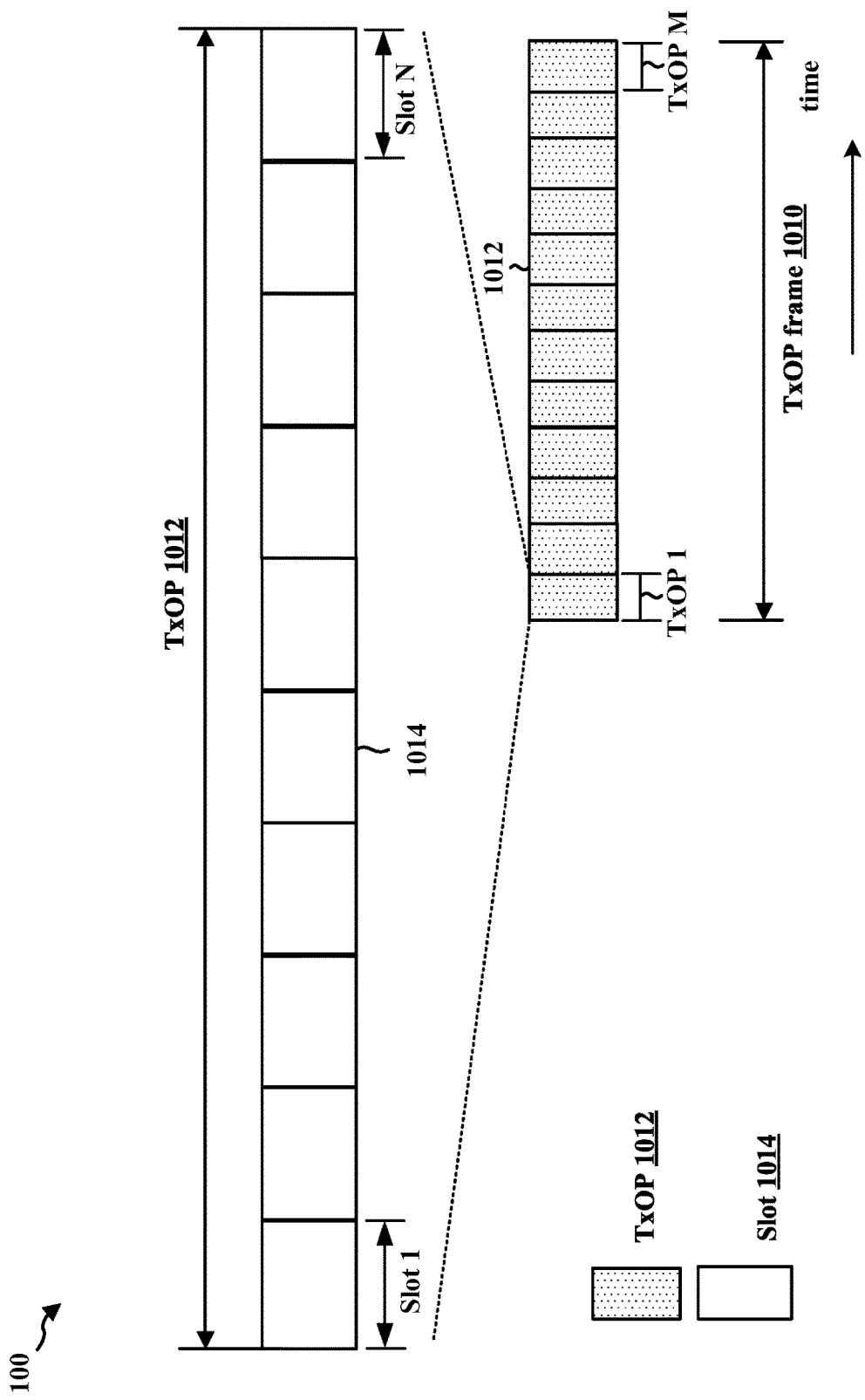
FIG. 10 is a diagram illustrating an example transmission opportunity (TxOP) frame structure.

FIG. 10 is a diagram 1000 illustrating an example TxOP frame 1010 in accordance with certain aspects of the present disclosure. The TxOP frame 1010 may include M TxOPs 1012, and each TxOP 1012 may include N slots. In the example illustrated in FIG. 10, the TxOP frame 1010 includes twelve TxOPs 1012 (e.g., M=12), each TxOP having ten slots 1016 (e.g., N=10). The example number of TxOPs in a TxOP frame, as well as the number of slots within a TxOP are merely examples to illustrate the principle. The number of TxOPs 1012 per TxOP frame 1010 is not limited to twelve, and the number of slots 1014 per TxOP 1012 is not limited to ten. Instead, the number of TxOPs 1012 per TxOP frame 1010 may include more or fewer than twelve and the number of slots 1014 per TxOP 1012 may include more or fewer than ten without departing from the scope of the present disclosure.

Figure 7:
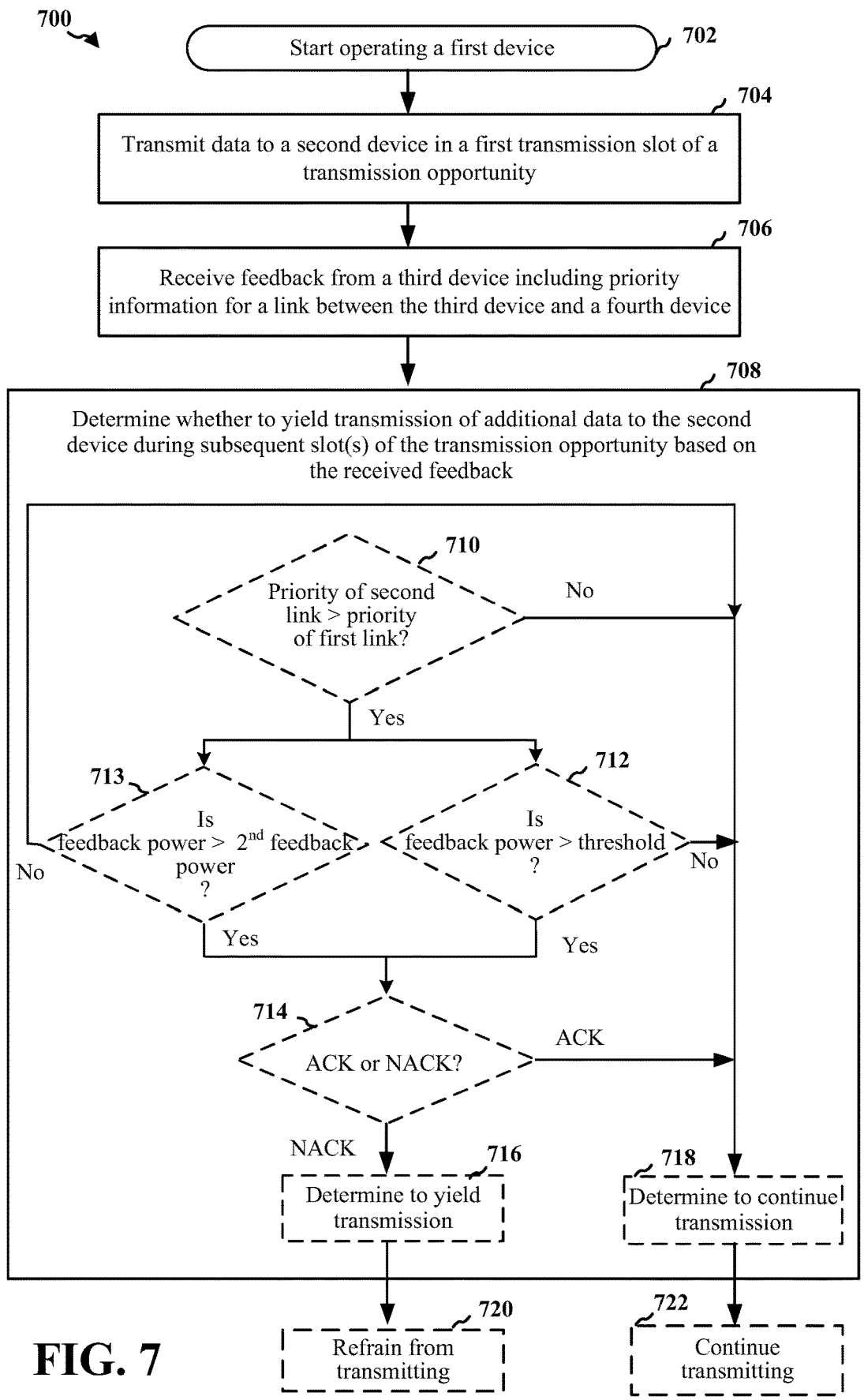
FIG. 7 is a flowchart of a method of wireless communication.

FIG. 7 is a flowchart 700 of a method of wireless communication. The method may be performed, for example, by an apparatus (e.g., the UE 104/350/404/506/ 1202/1204, the apparatus 802/802'; the processing system 914, which may include memory 360, 376 and which may be the entire device 310, 350 or a component of the device 310, 350, such as TX processor 368 or 316, RX processor 356 or 370, or controller/processor 359 or 375). As an example, the processing system 914 may comprise an entire UE or may comprise a component of the UE. Optional aspects are illustrated with a dashed line. The method enables an interference causing transmitter, to detect that it is causing interference to a higher priority link, and to take action to mitigate the interference. Accordingly, aspects of the method facilitate interference detection and management. Aspects may help devices yield to other transmitters even in the absence of a slot reservation procedure such as a RTS/CTS procedure.

At 702, the apparatus may be powered on and initialized. To facilitate an understanding of the techniques and concepts described herein, the method of flowchart 700 may be discussed with reference to the example shown in FIG. 5B. For example, the apparatus may be a first device (e.g., device C 506) which may be attempting to transmit data to a second device (e.g., device D 508) in a wireless communication environment where another device pair including a third device (e.g., device B 504) and a fourth device (e.g., device A 502) are also in communication. In some configurations, each of the second device, the third device, and the fourth device may be another UE or a base station. In one particular configuration, each of the apparatus (first device), the second device, the third device, and the fourth device is a UE. For the purposes of discussion, consider that the first and second devices may have established a first communication link, and another (e.g., second) communication link may exist between the third and fourth devices. Furthermore, a link priority associated with the link between the third and fourth devices is higher than a link priority associated with the link between the first and second devices.

At 704, the first device (e.g., device C 506) may transmit data to the second device (e.g., device D 508) in a first transmission slot of a transmission opportunity (TxOP). For example, transmission component 810 in FIG. 8 may transmit the data. In one configuration, the TxOP may comprise multiple transmission slots. For example, with reference to FIG. 5C, the set of data transmission subslots 534 of the slot 530 may correspond to the first transmission slot. Again, referring to FIG. 5B, the first device may be device C 506 which may transmit data in the first set of data transmission subslots 534 to device D 508. The TxOP to which the slot 530 corresponds may have multiple such slots, as described in connection with FIG. 6, with each slot including a set of data transmission subslots.

At 706, the first device may receive feedback (such as an ACK/NACK signal) from the third device. For example, reception component 804 in FIG. 8 may receive the feedback. In some configurations, the feedback may include priority information corresponding to a link between the third device and a fourth device. For example, with reference to FIG. 5B, the first device may be device C 506, the third device may be device B 504, and the fourth device may be device A 502. In such an example, device C 506 may receive an ACK/NACK signal from device B 504, the ACK/NACK signal may include priority information regarding the link between device A 502 and device B 504. In various configurations, the priority information may indicate a link priority level associated with the communication link. In some configurations, the priority information may be explicitly indicated in the ACK/NACK signal, e.g., as a priority index indicating a priority level of the link between the third device and the fourth device. In some other configurations, the link priority information may be implicitly indicated in the ACK/NACK signal, e.g., via a link identifier (ID) of the link between the third device and the fourth device. In such configurations, the link ID may be associated with a link priority, and once the link ID is recovered from the received ACK/NACK signal, the apparatus may determine the link priority using the link ID (e.g., by using the link ID as an index and looking up a priority information table to map the link ID with a corresponding link priority level). Furthermore, the first device may also be aware of the priority associated with the link between the first device and the second device. For the purposes of discussion, consider that the priority of the link between the third and fourth devices, as determined based on the priority information in the received ACK/NACK signal, is P2, and the priority associated with the link between the first and second devices is P1.

At 708, the first device may determine whether to yield transmission of additional data to the second device during at least a second transmission slot of the transmission opportunity based on the received feedback, e.g., based on the priority information indicated therein and/or other criteria as discussed below. The determination may be performed by determination component 806, or a subcomponent of determination component 806. For example, referring to FIG. 5B, upon receiving the NACK from device B 504, device C 506 (first device) may determine the priority of the link between device A 502 and device B 504 (e.g., based on the implicitly or explicitly indicated link priority in the received ACK/NACK signal).

Next, in accordance with one aspect, as part of the determining operation, at 710, the first device (device C 506) may determine whether the determined priority (P2) of the link associated with the third device (device A 502) and the fourth device (device B 504) is higher than the priority (P1) of the link associated with the first device (device C 506) and the second device (device D 508). In one configuration, if it is determined, at 710, that the determined priority (P2) of the link associated with the third device and the fourth device is higher than the priority (P1) of the link associated with the first device and the second device (e.g., when P2>P1), the operation may proceed to 712 or 713 (optional). Otherwise (e.g., when P2<P1), the operation may proceed from 710 to block 718.

As illustrated at 712 and 713, the first device may determine whether to yield transmission of additional data based on a received power level of the feedback. For example, the first device may determine whether a received power level of the feedback (e.g., measured at the first device and/or otherwise reported to the first device) is higher than one of a predetermined power threshold, at 712. Alternatively, or additionally, the first device may determine, at 713, whether the received power level of the feedback from the third device is higher than a received power level of a second feedback (e.g., ACK/NACK) that the first device may have received from the second device. For example, with reference to FIG. 5B, device C 506 (first device) may compare the received power level ($P_B$) of the received ACK/NACK signal from device B 504 (third device) with a predetermined power threshold ($P_{th}$) and check whether $P_B$ is less/greater than the power threshold $P_{th}$. Alternatively, or in addition to comparing $P_B$ to the power threshold $P_{th}$, device C 506 (first device) may compare $P_B$ corresponding to the received ACK/NACK signal from device B 504 (third device) with a received power level ($P_D$) of an ACK/NACK received from the second device (device D 508) to which the first device transmitted data. In accordance with one aspect, when $P_B<P_{th}$, the first device may infer that the transmitter of the ACK/NACK signal (e.g., device B 504) is not too close and that a transmission from the first device may not necessarily cause interference to the third device (device B 504) which is the receiver device corresponding to the high priority link. Similarly, when $P_B<P_D$, the first device may understand that the transmitter of the ACK/NACK signal (e.g., device B 504) may be farther away than the second device (device D 508) and the data transmission to the second device (device D 508) may not cause large interference to the third device, i.e., the high priority receiver (device B 504). In some configurations, when a higher priority link exist in proximity of the first device (e.g., P2>P1), the first device may be configured to yield transmission of additional data when the received power level of the ACK/NACK signal from the third device is higher than the predetermined power threshold (e.g., $P_B>P_{th}$) and/or higher than the received power level of the ACK/NACK signal from the second device (e.g., $P_B>P_D$). Accordingly, in some configurations, when, at 712 and/or 713, it is determined that $P_B<P_{th}$ and/or $P_B<P_D$, the operation may proceed to 714 (optional). In some other configurations, the operation may proceed from 712 or 713 directly to block 716. However, if, at 713, it is determined $P_B<P_{th}$ and/or at 712 that $P_B<P_D$, the operation may proceed to block 718.

At 714, the first device may determine whether the received feedback signal is an ACK or a NACK. For example, one or more bits or a flag in the received ACK/NACK signal may indicate whether the signal is an ACK or NACK. In accordance with one feature of certain configurations, when a higher priority link exist in proximity of the first device (e.g., priority condition P2>P1 satisfied), the first device may be configured to yield transmission of additional data only when the received ACK/NACK signal from the third device is a NACK. While a NACK from the third device may convey that the third device failed to receive/decode the transmission from its corresponding transmitter, the NACK may also implicitly indicate to the first device that the failure to receive/decode by the third device may be due to the interference caused to the third device by the transmission from the first device to the second device. Thus, in certain configurations, if, at 714, it is determined that the received ACK/NACK signal is a NACK, the operation may proceed to block 716. Otherwise in some configurations, the operation may proceed from 714 to block 718 when the received signal is an ACK.

While one or more of the optional determination operations indicated at blocks 712, 713, and 714 may be utilized in some configurations, it should be appreciated that implementation of such operations is optional. Thus, in some configurations, if it is determined (at 710) that the determined priority (P2) of the link associated with the third device and the fourth device is higher than the priority (P1) of the link associated with the first device and the second device (e.g., when P2>P1), the operation may proceed directly to block 716 and one or more of the optional operations indicated at blocks 712, 713, and 714 may be skipped. Otherwise (e.g., when P2<P1), the operation may proceed from 710 to block 718. Furthermore, when implemented, such operations (e.g., illustrated at 712 and 714) may be used in any combination with the determination operation shown at 710. For example, in some configurations, the determination block 708 flowchart 700 may include all of 710, 712, 713, and 714, while in some other configurations the determination block 708 may include 710 and 712, 710 and 713, or 710 and 714. In yet other configurations, the determination block might comprise a single one of 710, 712, 713, or 714 or any combination of 710, 712, 713, or 714.

Referring now to block 716. At 716, the first device may determine to yield transmission of additional data to the second device during at least the second transmission slot, e.g., to avoid causing interference to the third device, e.g., the higher priority receiver. For example, with reference to FIG. 5B, device C 506 may determine, based on the link priority information, received power level of feedback and/or other factors discussed above, to yield and not transmit data in the next upcoming (second) data transmission slot. In some configurations, the yielding decision may just be for a single transmission slot of a TxOP, whereas in some other configurations the yielding decision may be for the entire TxOP that may include multiple time slots (such as slot 530). Operation may proceed from block 716 to block 720.

At 720, the first device may refrain from transmitting the additional data to the second device during at least the second transmission slot. For example, transmission control component 808 and/or transmission component 810 in FIG. 8 may refrain from transmitting the additional data. For example, with reference to FIG. 5B, device C 506 may refrain from transmitting additional data to device D 508 during at least the next transmission slot (e.g., a slot subsequent to slot 530). In some configurations, based on the transmission yielding decision, the first device may yield transmission during the entire TxOP and refrain from transmitting additional data in any data transmission interval of the same TxOP.

On the other hand, at 718, the first device may determine to not yield transmission of additional data to the second device during at least the second transmission slot, e.g., based on the determinations and decisions at one or more of 710, 712, and 714 discussed above. Operation may proceed from block 718 to block 722.

At 722, the first device may transmit the additional data to the second device during at least the second transmission slot. For example, transmission control component 808 and/or transmission component 810 may transmit the additional data. For example, with reference to FIG. 5B, device C 506 may transmit additional data to device D 508 during at least the next transmission slot (e.g., a slot subsequent to slot 530).

The methods discussed above with respect to flowchart 700 may facilitate interference detection, management and mitigation in a wireless communication system, e.g., including V2X or D2D communication systems.

Figure 11:
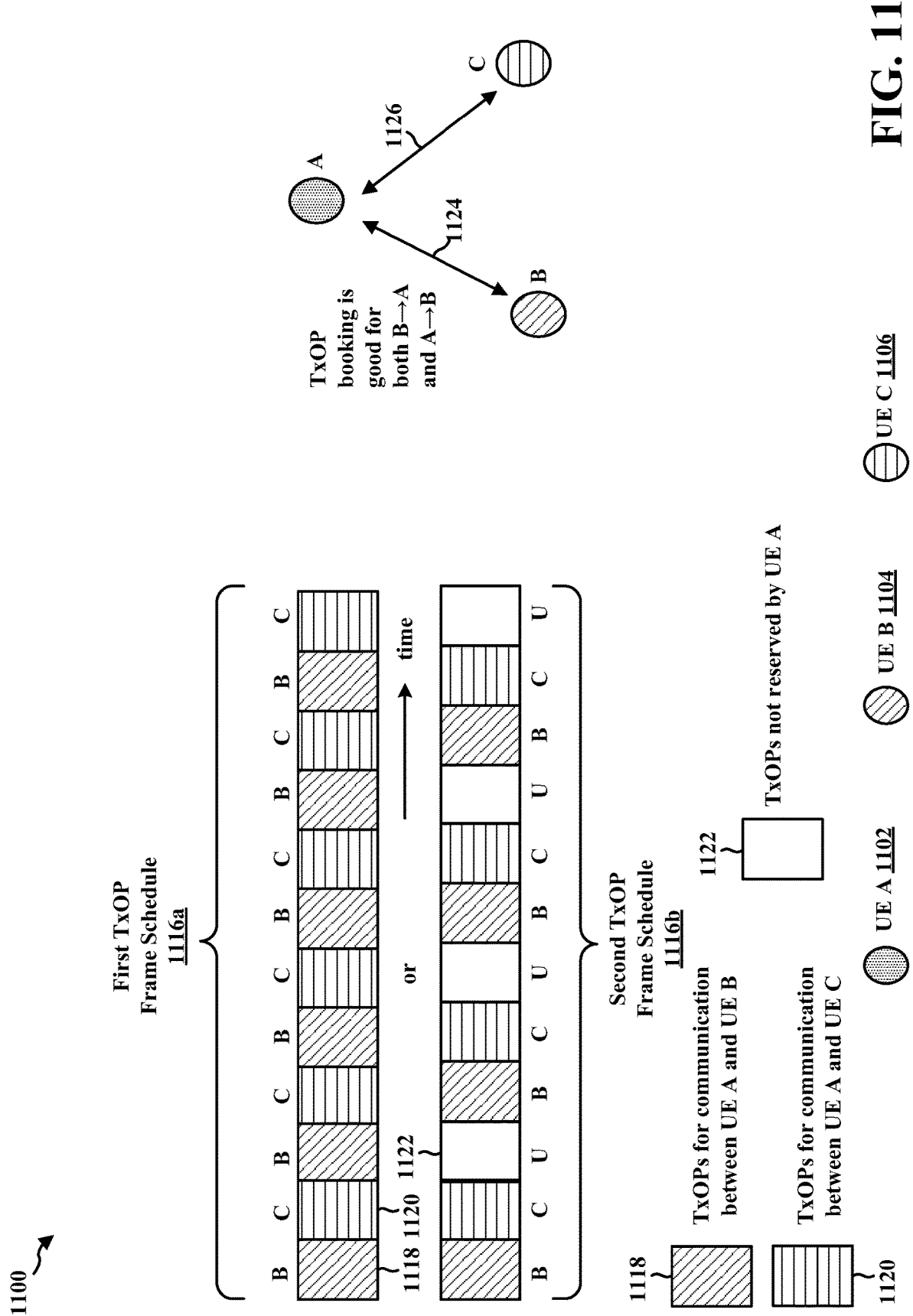
FIG. 11 is a diagram illustrating example TxOP frame schedules that may be used to reserve one or more TxOPs within a TxOP frame.

FIG. 11 is a diagram 1100 illustrating two example TxOP frame schedules 1116a, 1116b that may be used to reserve one or more TxOPs within a TxOP frame in accordance with certain aspects of the disclosure. In certain implementations, the example TxOP frame schedules 1116a, 1116b may be used by a set of neighbor UEs 1102, 1104, 1106 to overcome potential conflicts Referring to FIG. 11, the first example TxOP frame schedule 1116a may be used by, e.g., UE A 1102 to communicate with UE B 1104 and UE C 1106. The first example TxOP frame schedule 1116a may include a first set of TxOPs 1118 that are reserved for communications 1124 between UE A 1102 and UE B 1104 in either the transmission direction from A to B or the opposite direction from B to A (e.g., a pairwise reservation between the UE A 1102 and UE B 1104), and a second set of TxOPs 1120 that are reserved for communications 1126 between UE A 1102 and UE C 1106 (e.g., a pairwise reservation between the UE A 1102 and UE C 1106).

The second example TxOP frame schedule 1116b may be used by, e.g., UE A 1102 to communicate with UE B 1104 and UE C 1106. The second example TxOP frame schedule 1116b may include a first set of TxOPs 1118 that are reserved for communications 1124 between UE A 1102 and UE B 1104 (e.g., a pairwise reservation between the UE A 1102 and UE B 1104), a second set of TxOPs 1120 that are reserved for communications 1126 between UE A 1102 and UE C 1106 (e.g., a pairwise reservation between the UE A 1102 and UE C 1106), and a third set of TxOPs 1122 that are not reserved by UE A 1102, and hence, available for scheduling by other neighbor UEs.

Each of UE A 1102, UE B 1104, and UE C 1106 may perform a random access channel (RACH) procedure (e.g., a 4-way handshake between two UEs) to discover neighboring UEs. A UE may perform a beam-scanning or beamforming procedure. For example, a UE may perform monitor for a signal or perform measurements of a signal on each of plurality of possible beam directions, e.g., sweeping a set of predefined reception beam directions, in order to attempt to detect a signal from another UE in one of those directions. The process may be referred to as beam-scanning. The UE may select a beam based on a detected signal or based on a measurement of the signal in a particular beam direction.

A random access procedure may involve one UE transmitting a first random access message comprising a random access preamble, e.g., indicating a selected beam direction. The beam direction may be selected based on the beam scanning/beamforming procedure. The UE may receive a second random access message from a second UE in response to the first message and acknowledging the random access preamble from the first UE. The first UE may send a third random access message, e.g., indicating one or more channel measurements and/or identifying the first UE. The first UE may receive a fourth random access message from the second UE acknowledging the third message. The first UE may transmit communication in response to receiving the fourth random access message from the second UE. While this example is described in connection with a 4 step RACH procedure, a different number of messages may be exchanged as part of the random access procedure. For example, a 2 step random access procedure may be performed in which the first and the third random access messages from the first UE are combined into message A and the second and fourth response messages from the second UE are combined into message B.

Once the RACH procedure(s) between a set of neighbor UEs is complete (on a one time or periodic basis), TxOP reservations in a TxOP frame may be negotiated between the set of neighbor UEs.

A TxOP frame schedule may be semi-static in that a set of neighbor UEs may use the TxOP frame schedule for the duration of multiple TxOP frames. However, if a TxOP reserved for communication between two UEs is unused for a threshold period (e.g., if neither UE has data to exchange), the set of neighbor UEs may renegotiate the TxOP frame schedule so that resources may be more efficiently utilized, and hence, the network throughput may be increased.

Figure 12:
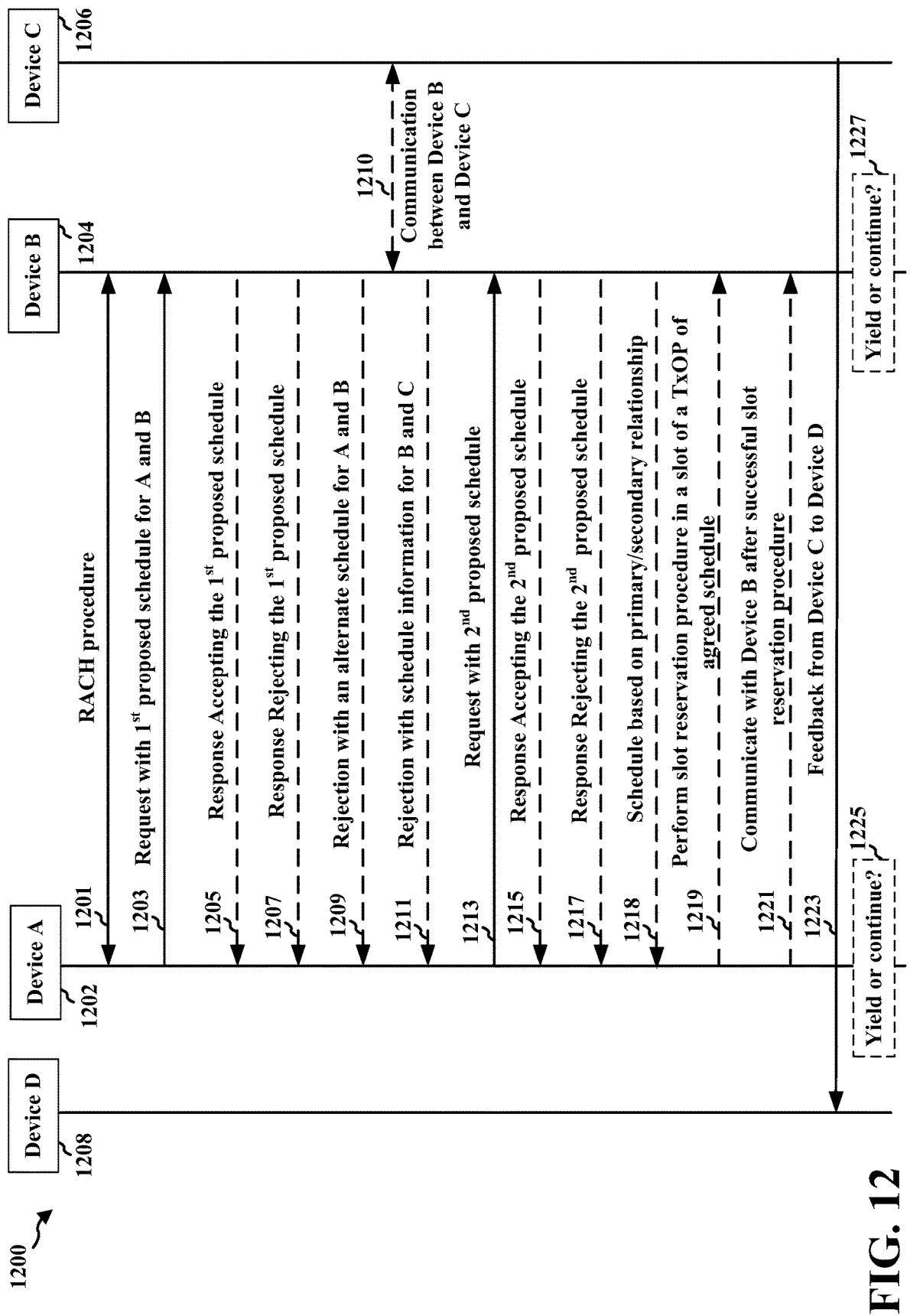
FIG. 12 is a diagram of an example communication flow between devices to negotiate resources for communication

The feedback based interference mitigation aspects presented herein may be employed in combination with the selection of TxOPs for use in wireless communication. For example, aspects presented herein may be used in combination with negotiation of a set of TxOPs for use in communication with another device. FIG. 12 illustrates an example communication flow 1200 between a first device (Device A) 1202 and a second device (Device B) 1204 including request(s)/responses(s) to negotiate resources for communication between the two devices. Aspects may include may include a TxOP a reservation procedure (e.g., a slow-loop reservation procedure) that may be performed in combination with the feedback based interference mitigation described herein. As described herein, the devices may first perform a RACH procedure, e.g., a 4 step RACH procedure 1201. Then, Device A and Device B may agree to use a set of TxOPs for communication.

In certain implementations, UEs may be unable to arbitrarily book TxOPs for communications with another UE because a scheduling conflict may arise when the same TxOP is reserved by another neighboring UE. Thus, UEs may use a TxOP reservation procedure in order to avoid scheduling conflicts with neighbor UEs.

In certain configurations, Device A 1202 may perform a beamforming procedure with each of Device B 1204, Device C 1206, and/or Device D 1208 to determine a preferred beamforming direction for communication. For example, Device A 1202 may perform the beamforming procedure as described above in connection with FIG. 4, e.g., by exchanging L2 messages related to beamforming, e.g., such as beam refining messages (e.g., beam_refining message) and/or instructions (e.g., beam_alive message) to maintain a previously determined beamforming direction.

In certain implementations, a primary-secondary relationship between the UE and one or more of the plurality of neighbor UEs may be established during the beamforming procedure. The primary-secondary relationship may be useful in scenarios in which a TxOP frame schedule cannot be agreed upon by two or more UEs. For example, when Device A 1202 is the primary UE, and an agreement cannot be reached with a secondary UE with respect to a TxOP frame schedule, Device A 1202 may select the TxOP frame schedule that will be used by Device A 1202 and the secondary UE. In certain implementations, the primary-secondary relationship may be negotiated and/or determined during the 4-way handshake RACH procedure performed to discover neighbor UEs. In certain other implementations, the primary-secondary relationship may be chosen at random. The UE acting as the primary UE may switch periodically so each UE in a set of neighbor UEs is the primary UE for a certain period of time.

In certain configurations, Device A 1202 may perform a beam sensing procedure to determine which TxOPs of the M TxOPs in a TxOP frame are available in the preferred beamforming direction for each of the neighbor UEs.

Device A 1202 may generate a first transmission schedule based at least in part on the information related to beam sensing procedure. For example, Device A 1202 may generate a proposed first transmission schedule, e.g., similar to the example schedules of FIG. 11, that reserves a first set of TxOPs 1118 for communication with Device B 1204. The schedule may also include a second set of TxOPs 1120 that are reserved for communication with/of a different device. The schedule may also include a third set of TxOPs 1122 that are not reserved by Device A 1202. In certain configurations, the proposed first transmission schedule may include a reserved indicator (e.g., an 'R' flag) to indicate that the second set of TxOPs of the M TxOPs is reserved for communications between Device A 1202 and an unspecified neighbor UE, e.g., in order to protect the privacy of the neighbor UE. In certain implementations, the proposed first transmission schedule may include a beam index and/or a quasi-collocation (QCL) index (or other QCL information) indicating the preferred beamforming direction associated with one or more of the first set of TxOPs and/or the second set of TxOPs. Including the beam index and/or QCL index may indicate to neighboring UEs which beam directions communications using the reserved TxOPs may occur. Based at least in part on the beam index and/or QCL index, the neighbor UEs may be able to determine to use the same TxOP for communications with other UEs in different beamforming directions, thereby increasing the spatial reuse of the network.

Device A 1202 may transmit a scheduling request 903 to Device B 1204 along with a proposed schedule (of TxOPs) for the communication between Device A 1202 and Device B 1204. The proposed schedule may be transmitted, e.g., using sidelink based communication. The first scheduling request may include the proposed first transmission schedule for M TxOPs, where M=10.

As illustrated at 1205, Device B 1204 may transmit a response accepting the proposed schedule from 1203. For example, the first scheduling response may accept the first scheduling request by not including an alternative transmission schedule in the first scheduling response 1205. As illustrated at 1207, Device B 1204 may respond with a rejection of the request. The rejection may be due to a conflict of the proposed schedule in 1203 with another schedule used by Device B 1204 for communication with another device. Thus, additionally and/or alternatively, the scheduling response may include an alternative transmission schedule for communication between Device A 1202 and Device B 1204 based on the M TxOPs, e.g., as illustrated at 1209.

The alternate transmission schedule sent at 1209 may indicate a fourth set of TxOPs 544 of the M TxOPs that is reserved by UE B 504 for communication with UE A 502 as an alternative to the proposed schedule sent by Device A 1202, at 1203. Thus, Device B 1204 may continue the negotiation even when the first scheduling response rejects the first scheduling request by including a proposed alternative transmission schedule. Additionally and/or alternatively, Device B 1204 may respond to Device A 1202 by sending neighbor scheduling information 1211 about TxOPs that are reserved for communication 1210 between the UE B 1206 and a different UE (e.g., Device C 1206) from among a plurality of neighbor UEs. Device B 1204 might indicate the reserved resources without identifying Device C 1206.

Using the neighbor scheduling information, Device A 1202 may generate a second proposed transmission schedule by adjusting and/or updating the first proposed transmission schedule sent at 1203 send the second scheduling request, e.g., as illustrated at 1213. In certain aspects, the second proposed transmission schedule, sent at 1213, may indicate a different set of TxOPs of the M TxOPs reserved for communication between Device A 1202 and Device B 1204. The different set of TxOPs (e.g., in the first proposed transmission schedule at 1203 and in the second proposed transmission schedule at 1213) may include at least one different TxOPs. The TxOPs may be completely different or only partially different.

Device A 1202 may receive a second scheduling response from Device B 1204, e.g., at 1215/1217 in FIG. 12. In certain aspects, the second scheduling response may either accept (e.g., 1215) or reject (e.g., 1217) the second scheduling request 1213. The second scheduling response 1217 may include another alternative transmission schedule and/or or additional scheduling information, similar to example rejections 1209, 1211. The process may continue until Device A 1202 and Device B 1204 find a transmission schedule that is acceptable for both devices.

In scenarios in which a TxOP frame schedule cannot be agreed upon by Device A 1202 and Device B 1204, one of the Devices may select the TxOP schedule based on a primary-secondary relationship between the UE. Thus, Device B 1204 may send a message 1218 with a schedule selected by Device B 1204 as the primary device that should be used by Device A 1202 as the secondary device. The primary and secondary device relationship may be agreed at an earlier point, such as during the RACH procedure 1201. Similarly, if Device A 1202 were the primary device, then Device A 1202 would send the message 1218 to Device B 1204 as the secondary device. The selected schedule, in message 1218, may be sent after a certain number of scheduling requests or proposed schedules and responses rejecting proposed schedules.

Once the two devices agree upon a transmission schedule, Device A 1202 may monitor or communicate data based on the accepted transmission schedule, e.g., such as when the second scheduling response 1215 does not include an alternate transmission schedule. Upon agreement of a schedule, communicating or monitoring for communications may take place according to the schedule. For example, a UE may tune transmission beam and/or a receive beam to a beamforming direction based on the schedule. Using a TxOP schedule negotiated using the techniques described above, Device A 1202 may transmit and/or receive one or more data transmissions from Device B 1204 in a reserved TxOP. When Device A 1202 and Device B 1204 are both vehicles, the V2X messages may communicate information related to the UE's speed, acceleration, direction, route, and/or destination, etc. Using the information received in the V2X message(s), Device A 1202 may change one or more of speed, acceleration, direction, route, and/or destination, etc. for safety.

Periodically, Device A 1202 may determine if the network traffic has changed, e.g., either using the beam sensing procedure (e.g., sensing beam usage patterns by a set of neighbor UEs, sensing which beam directions have network traffic, etc.)) described above, or based on TxOP scheduling updates received from neighbor UEs. Upon determining the network traffic has changed, Device A 1202 may generate a new transmission schedule that is included in a schedule update message (e.g., SCH_UPDATE message) that is sent to one or more of the neighboring UEs.

Additionally, aspects may include a fast-loop reservation procedure that includes use of, e.g. a Request to Send (RTS)/Clear to Send (CTS) type mechanism. For example, UEs may first negotiate or come to an agreement with another UE about the TxOPs, e.g., a schedule of TxOPs, that will be used to communicate with the UE. Then, within the agreed TxOPs, the UE may use RTS/CTS to determine whether or not to transmit within slots of a scheduled TxOP. UEs may further determine whether to yield or continue transmission within a scheduled TxOP based on feedback received from other devices.

As illustrated in FIG. 12, once Device A 1202 and Device B 1204 agree on a schedule, whether Device B 1204 accepts the $1^{st}$ proposed schedule at 1205, accepts the $2^{nd}$ proposed schedule at 1215, or Device A 1202 accepts the alternate schedule proposed by Device B 1204 at 1209, Device A 1202 may perform a slot reservation procedure in a slot of one of the TxOPs from the agreed schedule. If Device A 1202 and Device B 1204 agreed to a transmission schedule similar to 1171a, in which Device A 1202 may communicate with Device B 1204 in every other TxOP of a TxOP frame, Device A 1202 may perform the slot reservation procedure at 1219 in a slot of a TxOP 1118, that is reserved for communication with Device B 1204, before transmitting to Device B 1204. For example, Device A 1202 may send a RTS and monitor for a CTS 1221. Once Device A 1202 has successfully performed the slot reservation procedure, Device A 1202 may communicate with Device B 1204. For example, Device A 1202 may transmit communication to Device B 1204 in at least one slot of the TxOP following a successful slot reservation procedure.

Even when using a TxOP from the schedule upon which Device A 1202 and Device B 1204 agreed, Device A 1202 or Device B 1204 may determine that communication within a TxOP would interference with communication by other devices, e.g., as described in connection with FIGS. 5A-8. For example, Device A 1202 or Device B 1204 may detect feedback 1223 (e.g., an ACK/NACK) transmitted from Device C 1206 to Device D 1208. Device A 1202, at 1225, or Device B 1204, at 1227, may determine whether to yield the resources of the TxOP in order to avoid causing interference to the communication between Devices C 1206 and D 1208 or to continue to transmit in subsequent slot(s) of the TxOP. The determination may be based on priority, received power of the ACK/NACK, whether the feedback is an ACK or a NACK, etc., such as described in connection with 708.

Figure 8:
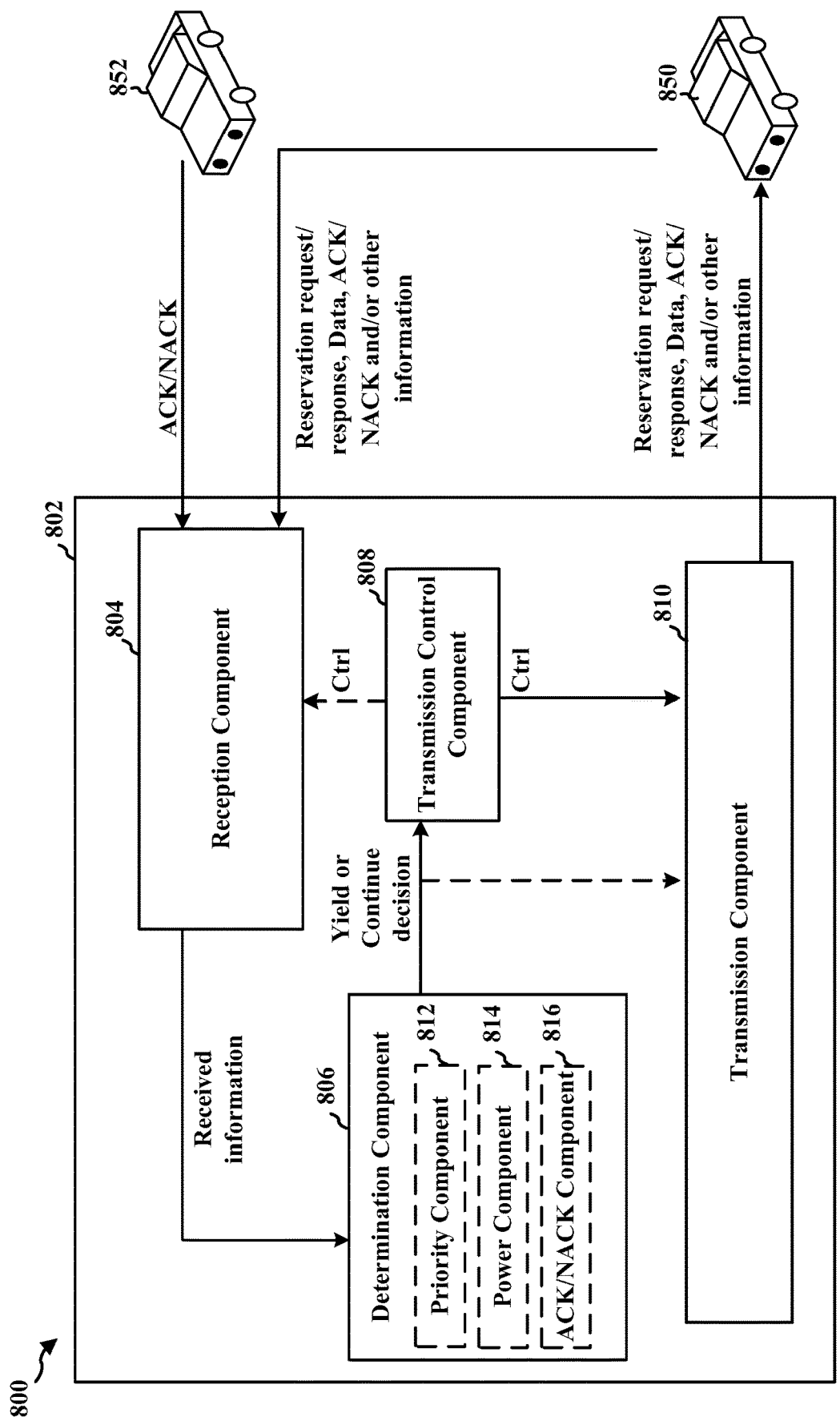
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus 802 may be a wireless communication device, e.g., a UE or a base station, that may implement the method of flowchart 700. The apparatus 802 may comprise one of devices 310, 350 in FIG. 3. The apparatus may comprise the entire device 310 or 350 or may be a component of the device. For example, the apparatus may be device C 506 of FIG. 5B. In one configuration, the apparatus 802 may include a reception component 804, a determination component 806, a control component 808, and a transmission component 810.

The reception component 804 may be configured to receive transmission slot reservation requests/responses, data, feedback (e.g., ACK/NACK signals), and/or other information from other devices including, e.g., device 850 and device 852. For example, with reference to FIG. 5B, the apparatus 802 may be device C 506, device 850 may be device D 508 having a communication link with device C 506, and device 852 may be device B 504 having a communication link with device A (not shown). In some configurations, the reception component 804 may be configured to receive feedback from device 850 as well as other devices, e.g., as described in connection with 706 in FIG. 7. The signals/information may be received by the reception component 804 in accordance with the methods discussed supra including the method of flowchart 700. The received signals/information may be provided to one or more components of the apparatus 802 for further processing and use in performing various operations.

The transmission component 810 may be configured to transmit transmission slot reservation requests/responses, data, feedback, and/or other information to one or more external devices including, e.g., device 850. In some configurations, the transmission component 810 may transmit data to a second device (e.g., device 850) in a first transmission slot of a transmission opportunity, e.g., as described in connection with 704 in FIG. 7. In some configurations, the transmission component 810 may operate in combination with and/or under the control of the control component 808. For example, based on one or more determinations/decisions made by the components of the apparatus 802 in accordance with the method of flowchart 700, the control component 808 may control the transmission component 810 to yield transmission of data in one or more data transmission slots and refrain from transmitting, e.g., as described in connection with 720. Similarly, based on one or more conditions being satisfied in accordance with the method of flowchart 700, the control component 808 may control the transmission component 810 to not yield transmission of data and transmit data and/or other information, e.g., as described in connection with 722.

In one configuration, the reception component 804 may receive a feedback from a third device (e.g., device 852). The feedback may include priority information corresponding to a link between the third device and a fourth device. For example, with reference to FIG. 5B, the apparatus 802 may be device C 506 (first device), the third device 852 may be device B 504, and the fourth device may be device A 502. The feedback signal may be received via the reception component 804 from device B 504 and may include priority information regarding the link between device A 502 and device B 504. As discussed supra, the priority information may indicate a link priority level associated with the communication link between the third device and the fourth device. In some configurations, the priority information may be explicitly indicated in the feedback, e.g., as a priority index indicating a priority level of the link between the third device and the fourth device. In some other configurations, the link priority information may be implicitly indicated in the feedback, e.g., via a link ID included in an ACK/NACK signal.

The determination component 806 may be configured to determine the link priority (e.g., P2) of the link between the third device and the fourth device) using the priority information included in the feedback. In various configurations, the determination component 806 may be further configured to determine whether to yield transmission of additional data to the second device during at least a second transmission slot of the transmission opportunity. As discussed in detail with respect to flowchart 700, the determination whether to yield transmission of additional data to the second device may be based on the priority information indicated in the received feedback and optionally on other factors (e.g., received power level of the ACK/NACK signal, and/or whether received signal from the third device is ACK or NACK). Thus, in various configurations, as part of being configured to make a transmission yielding decision, the determination component 806 may comprise a priority component 812 configured to determine the priority of the link between the third device (e.g., device B 504) and the fourth device (device A 502), e.g., based on the implicitly or explicitly indicated link priority in the received feedback. In some configurations, the determination component 806 comprise a power component 814 configured to, alone or in combination with the reception component 804, measure the received power level of the feedback from the third device 852. The priority component 812 may be further configured to determine whether the determined priority (P2) of the link associated with the third device (device A 502) and the fourth device (device B 504) is higher than a priority (P1) of the link associated with the first device (apparatus 802/device C 506) and the second device (device 850/device D 508). In one configuration, the determination component 806 may be configured to determine/decide to yield transmission of additional data to the second device during at least a second transmission slot of the TxOP when the determined priority (P2) of the link associated with the third device and the fourth device is higher than the priority (P1) of the link associated with the first device and the second device (e.g., when P2>P1). In one configuration, the determination component 806 may be configured to determine/decide to not yield transmission of additional data to the second device during at least a second transmission slot if the priority (P2) of the link associated with the third device and the fourth device is lower than the priority (P1) of the link associated with the first device and the second device (e.g., when P2<P1).

In one configuration, the determination component 806 may be configured to determine/decide to yield transmission of additional data to the second device during at least a second transmission slot when P2>P1, and the received power level of the feedback is greater than one of a predetermined power threshold or a received power level of a second feedback (e.g., ACK/NACK signal) from the second device. In one configuration, the determination component 806 may comprise an ACK/NACK component 816 configured to determine/decide to yield transmission of additional data to the second device during at least a second transmission slot when P2>P1, and the received feedback comprises a NACK. In one such configuration, the determination component 806 may be configured to determine to not yield transmission of additional data to the second device when P2>P1, but the received feedback comprises an ACK. Thus, the determination component 806 may be configured to determine whether or not the apparatus 802 should yield transmission of additional data to the second device (device 850) in one or more transmission slots based on various conditions discussed above and further discussed in connection with block 708 of flowchart 700.

In various configurations, the result of the determination of whether or not to yield transmission is provided (e.g., as a control signal or other indication) to the control component 808 and/or directly to the transmission component. Depending on the implementation, in some configurations, the transmission component 810 may be controlled by the control component 808 to refrain from transmitting the additional data to the second device during at least the second transmission slot when the determination component 806 determines to yield transmission of additional data to the second device. In a similar manner, the transmission component 810 (alone, in combination with and/or under the control of the control component 808) may be configured to transmit the additional data to the second device during at least the second transmission slot when the determination component 806 determines to not yield transmission of additional data to the second device.

The control component 808 may be further configured to control the operation of the transmission component 810 (e.g., when to transmit data, feedback and/or other signals) and/or other components of the apparatus 802 in accordance with the features of the disclosed methods.

The apparatus may include additional components that perform each of the blocks of the algorithm in the aforementioned flowchart of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
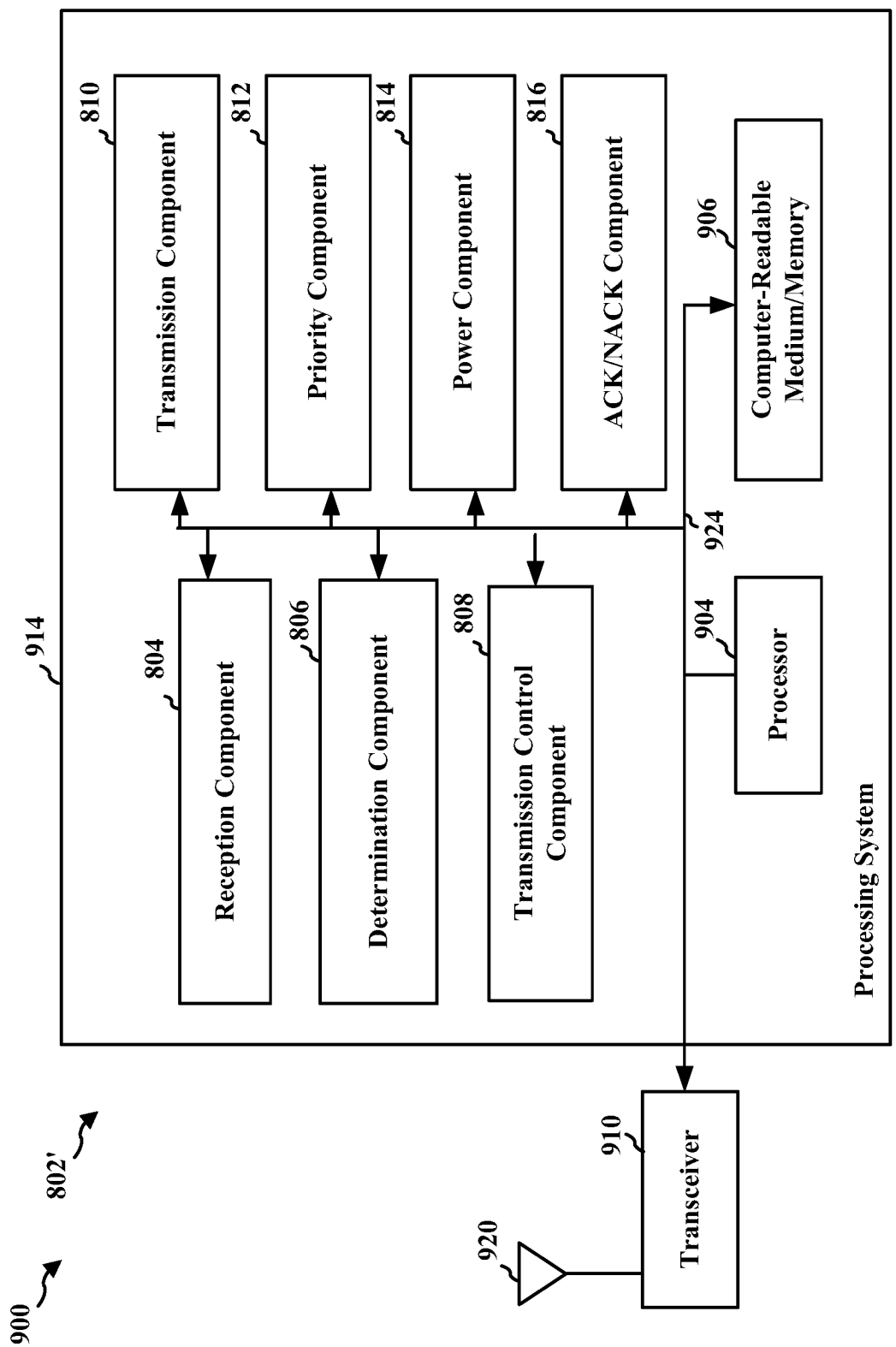
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816. The components may be software components running in the processor 904, resident/stored in the computer readable medium/memory 906, one or more hardware components coupled to the processor 904, or some combination thereof. In one configuration, the processing system 914 may be a component of the device 350 and may include the memory 360 and/or at least one of the TX processor 368, the RX processor 356, and the controller/processor 359. In another configuration, the processing system 914 may be a component of the device 310 and may include the memory 376 and/or at least one of the TX processor 316, the RX processor 370, and the controller/processor 375. Alternately, the processing system may comprise an entire UE or an entire base station.

In one configuration, the apparatus 802/802' may be a first device for wireless communication including means for transmitting data to a second device in a first transmission slot of a transmission opportunity. The apparatus 802/802' may further comprise means for receiving a feedback from a third device, the feedback including priority information corresponding to a link between the third device and a fourth device. In some configurations, the apparatus 802/802' may further comprise means for determining whether to yield transmission of additional data to the second device during at least a second transmission slot of the transmission opportunity based on the priority information.

In some configurations, the means for determining is further configured to determine, based on the priority information, whether a priority of the link between the third device and the fourth device is greater than a priority of a link between the apparatus 802/802' (the first device) and the second device. In some configurations, the means for determining is further configured to determine to yield transmission of additional data to the second device during at least the second transmission slot when the priority of the link between the third device and the fourth device is greater than the priority of the link between the apparatus 802/802' (the first device) and the second device. In some configurations, the apparatus 802/802' may comprise means for controlling the apparatus 802/802' (and/or the means for transmitting) to refrain from transmitting the additional data to the second device during at least the second transmission slot.

In some configurations, the means for determining may be further configured to determine to not yield transmission of additional data to the second device during at least the second transmission slot when the determined priority of the link between the third device and the fourth device is lower than the priority of the link between the apparatus 802/802' (the first device) and the second device. In some such configurations, the means for transmitting may be further configured to transmit the additional data to the second device during at least the second transmission slot.

In some configurations, the first transmission slot and the second transmission slot may correspond to the same transmission opportunity comprising multiple transmission slots. In some such configurations, the means for determining may be further configured to determine to yield transmission of the additional data during the multiple transmission slots of the transmission opportunity following the first transmission slot. In some such configurations, the means for controlling may be further configured to control the apparatus 802/802' (the first device) to refrain from transmitting the additional data during the multiple transmission slots of the transmission opportunity following the first transmission slot.

In some configurations, the means for determining may be configured to determine whether to yield transmission of additional data to the second device during at least a second transmission slot of the transmission opportunity further based on a received power level of the feedback. In some such configurations, the means for determining may be further configured to determine to yield transmission of additional data to the second device when the priority of the link between the third device and the fourth device is higher than the priority of the link between the apparatus 802/802' (the first device) and the second device, and the received power level of the feedback is greater than one of a predetermined power threshold or a received power level of a second feedback from the second device.

In some configurations, the means for determining may be further configured to determine to yield transmission of additional data to the second device during at least the second transmission slot when the priority of the link between the third device and the fourth device is greater than the priority of the link between the apparatus 802/802' (the first device) and the second device, and the received feedback comprises a NACK. In some such configurations, the means for determining may be further configured to determine to not yield transmission of additional data to the second device during at least the second transmission slot when the priority of the link between the third device and the fourth device is greater than the priority of the link between the apparatus 802/802' (the first device) and the second device, and when the received feedback comprises an ACK.

In one configuration, the apparatus 802/802' (the first device), the second device, the third device, and the fourth device may be user equipments. In another configuration, apparatus 802/802' (the first device) may be a user equipment, and the second device may be a base station.

The aforementioned means may be one or more of the aforementioned components of the apparatus 802 and/or the processing system 914 of the apparatus 802' configured to perform the functions recited by the aforementioned means. As described supra, in one configuration the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first device, comprising:
   transmitting data to a second device in a first transmission slot of a transmission opportunity on a first link between the first device and the second device;
   receiving acknowledgment (ACK) or negative acknowledgment (NACK) feedback from a third device, the feedback including one or more bits of information indicating priority information corresponding to a second link between the third device and a fourth device; and
   determining whether to yield transmission of additional data to the second device during at least a second transmission slot of the transmission opportunity based on the priority information indicated by the one or more bits of information included in the feedback from the third device.

2. The method of claim 1, wherein the first link has a first priority, the method further comprising:
   determining, based on the priority information, whether a second priority of the second link between the third device and the fourth device is greater than the first priority of the first link between the first device and the second device.

3. The method of claim 2, further comprising:
   determining to yield transmission of the additional data to the second device during at least the second transmission slot upon determining that the second priority of the second link between the third device and the fourth device is greater than the first priority of the first link between the first device and the second device; and
   refraining from transmitting the additional data to the second device during at least the second transmission slot.

4. The method of claim 2, further comprising:
   determining to continue transmission of the additional data to the second device during at least the second transmission slot upon determining that the second priority of the second link between the third device and the fourth device is lower than the first priority of the first link between the first device and the second device; and
   transmitting the additional data to the second device during at least the second transmission slot.

5. The method of claim 3, wherein the first transmission slot and the second transmission slot correspond to a same transmission opportunity comprising multiple transmission slots.

6. The method of claim 5, wherein determining to yield transmission of the additional data to the second device during at least the second transmission slot comprises determining to yield transmission of the additional data during the multiple transmission slots of the transmission opportunity following the first transmission slot; and
   wherein refraining from transmitting the additional data to the second device comprises refraining from transmitting the additional data during the multiple transmission slots of the transmission opportunity following the first transmission slot.

7. The method of claim 1, wherein the priority information comprises a priority index indicating a priority level of the second link between the third device and the fourth device.

8. The method of claim 1, wherein the priority information comprises a link identifier (ID) of the second link between the third device and the fourth device, and wherein the link ID is associated with a priority of the second link between the third device and the fourth device, and implicitly indicates the priority of the second link.

9. The method of claim 1, wherein the first device, the second device, the third device, and the fourth device are user equipments.

10. The method of claim 1, wherein one of the first device and the second device is a user equipment, and the other one of the first device and the second device is a base station.

11. The method of claim 1, wherein one of the third device and the fourth device is a user equipment, and the other one of the third device and the fourth device is a base station.

12. The method of claim 1, wherein the determining whether to yield transmission of the additional data to the second device during at least the second transmission slot of the transmission opportunity is further based on a first received power level of a feedback signal for the feedback.

13. The method of claim 12, wherein the determining whether to yield transmission of the additional data to the second device comprises determining to yield transmission of the additional data to the second device when a second priority of the second link between the third device and the fourth device is higher than a first priority of the first link between the first device and the second device, and the first received power level of the feedback signal is greater than one of a predetermined power threshold or a second received power level of a second feedback from the second device.

14. The method of claim 1, further comprising:
   determining to yield transmission of the additional data to the second device during at least the second transmission slot upon determining that a second priority of the second link between the third device and the fourth device is greater than a first priority of the first link between the first device and the second device, and the feedback comprises a NACK; and
   determining to not yield transmission of the additional data to the second device during at least the second transmission slot upon determining that the second priority of the second link between the third device and the fourth device is greater than the first priority of the first link between the first device and the second device, and when the feedback comprises an ACK.

15. A first device for wireless communications, comprising:
   means for transmitting data to a second device in a first transmission slot of a transmission opportunity on a first link between the first device and the second device;
   means for receiving acknowledgment (ACK) or negative acknowledgment (NACK) feedback from a third device, the feedback including one or more bits of information indicating priority information corresponding to a second link between the third device and a fourth device; and
   means for determining whether to yield transmission of additional data to the second device during at least a second transmission slot of the transmission opportunity based on the priority information indicated by the one or more bits of information included in the feedback from the third device.

16. The first device of claim 15, wherein the first link has a first priority, and wherein the means for determining is further configured to determine, based on the priority information, whether a second priority of the second link between the third device and the fourth device is greater than the first priority of the first link between the first device and the second device, wherein the means for determining is further configured to determine to yield transmission of the additional data to the second device during at least the second transmission slot when the second priority of the second link between the third device and the fourth device is greater than the first priority of the first link between the first device and the second device; and wherein the first device further comprises means for controlling the first device to refrain from transmitting the additional data to the second device during at least the second transmission slot.

17. The first device of claim 16, wherein the means for determining is further configured to determine to continue transmission of the additional data to the second device during at least the second transmission slot when the second priority of the second link between the third device and the fourth device is lower than the first priority of the first link between the first device and the second device; and wherein the means for transmitting is further configured to transmit the additional data to the second device during at least the second transmission slot.

18. The first device of claim 16, wherein the first transmission slot and the second transmission slot correspond to a same transmission opportunity comprising multiple transmission slots, wherein the means for determining is further configured to determine to yield transmission of the additional data during the multiple transmission slots of the transmission opportunity following the first transmission slot; and wherein the means for controlling is further configured to control the first device to refrain from transmitting the additional data during the multiple transmission slots of the transmission opportunity following the first transmission slot.

19. The first device of claim 15, wherein the priority information comprises a priority index indicating a priority level of the second link between the third device and the fourth device, or wherein the priority information comprises a link identifier (ID) of the second link between the third device and the fourth device, and wherein the link ID is associated with a priority of the second link between the third device and the fourth device, and implicitly indicates the priority of the second link.

20. The first device of claim 15, wherein the means for determining is configured to determine whether to yield transmission of the additional data to the second device during at least the second transmission slot of the transmission opportunity further based on a received power level of a feedback signal for the feedback.

21. The first device of claim 15, wherein the means for determining is further configured to:

determine to yield transmission of the additional data to the second device during at least the second transmission slot when a second priority of the second link between the third device and the fourth device is greater than a first priority of the first link between the first device and the second device, and the feedback comprises a NACK; and determine to not yield transmission of the additional data to the second device during at least the second transmission slot when the second priority of the second link between the third device and the fourth device is greater than the first priority of the first link between the first device and the second device, and when the feedback comprises an ACK.

22. A first device for wireless communications, comprising:

a memory; and at least one processor coupled to the memory and configured to:

transmit data to a second device in a first transmission slot of a transmission opportunity on a first link between the first device and the second device;

receive acknowledgment (ACK) or negative acknowledgment (NACK) feedback from a third device, the feedback including one or more bits of information indicating priority information corresponding to a second link between the third device and a fourth device; and determine whether to yield transmission of additional data to the second device during at least a second transmission slot of the transmission opportunity based on the priority information indicated by the one or more bits of information included in the feedback from the third device.

23. The first device of claim 22, wherein the first link has a first priority, and wherein the at least one processor is further configured to determine, based on the priority information, whether a second priority of the second link between the third device and the fourth device is greater than the first priority of the first link between the first device and the second device, and wherein the at least one processor is further configured to:

determine to yield transmission of the additional data to the second device during at least the second transmission slot when the second priority of the second link between the third device and the fourth device is greater than the first priority of the first link between the first device and the second device; and refrain from transmitting the additional data to the second device during at least the second transmission slot.

24. The first device of claim 23, wherein the at least one processor is further configured to:

determine to not yield transmission of the additional data to the second device during at least the second transmission slot when the second priority of the second link between the third device and the fourth device is lower than the first priority of the first link between the first device and the second device; and transmit the additional data to the second device during at least the second transmission slot.

25. The first device of claim 23, wherein the first transmission slot and the second transmission slot correspond to a same transmission opportunity comprising multiple transmission slots, and wherein the at least one processor is further configured to:

determine to yield transmission of the additional data during the multiple transmission slots of the transmission opportunity following the first transmission slot; and refrain from transmitting the additional data during the multiple transmission slots of the transmission opportunity following the first transmission slot.

26. The first device of claim 22, wherein the priority information comprises a priority index indicating a priority level of the second link between the third device and the fourth device.

27. The first device of claim 22, wherein the priority information comprises a link identifier (ID) of the second link between the third device and the fourth device, and wherein the link ID is associated with a priority of the second link between the third device and the fourth device, and implicitly indicates the priority of the second link.

28. The first device of claim 22, wherein the at least one processor is configured to determine whether to yield transmission of the additional data to the second device during at least the second transmission slot of the transmission opportunity further based on a received power level of a feedback signal for the feedback.

29. The first device of claim 22, wherein the at least one processor is further configured to:
 determine to yield transmission of the additional data to the second device during at least the second transmission slot when a second priority of the second link between the third device and the fourth device is greater than a first priority of the first link between the first device and the second device, and the feedback comprises a NACK; and
 determine to not yield transmission of the additional data to the second device during at least the second transmission slot when the second priority of the second link between the third device and the fourth device is greater than the first priority of the first link between the first device and the second device, and when the feedback comprises an ACK.

30. A non-transitory computer-readable medium storing computer executable code for wireless communication at a first device, comprising code to:
 transmit data to a second device in a first transmission slot of a transmission opportunity on a first link between the first device and the second device;
 receive acknowledgment (ACK) or negative acknowledgment (NACK) feedback from a third device, the feedback including one or more bits of information indicating priority information corresponding to a second link between the third device and a fourth device; and
 determine whether to yield transmission of additional data to the second device during at least a second transmission slot of the transmission opportunity based on the priority information indicated by the one or more bits of information included in the feedback from the third device.

* * * * *